US010769031B2

(12) United States Patent
Higuchi et al.

(10) Patent No.: US 10,769,031 B2
(45) Date of Patent: Sep. 8, 2020

(54) LOST DATA RECOVERY FOR VEHICLE-TO-VEHICLE DISTRIBUTED DATA STORAGE SYSTEMS

(71) Applicant: TOYOTA JIDOSHA KABUSHIKI KAISHA, Toyota-shi, Aichi-ken (JP)

(72) Inventors: Takamasa Higuchi, Mountain View, CA (US); Onur Altintas, Mountain View, CA (US); Kentaro Oguchi, Mountain View, CA (US)

( * ) Notice: Subject to any disclaimer, the term of this patent is extended or adjusted under 35 U.S.C. 154(b) by 0 days.

(21) Appl. No.: 16/200,574

(22) Filed: Nov. 26, 2018

(65) Prior Publication Data

US 2020/0167241 A1    May 28, 2020

(51) Int. Cl.
| | |
|---|---|
| H04L 9/32 | (2006.01) |
| G06F 11/14 | (2006.01) |
| H04W 4/44 | (2018.01) |
| H04W 8/30 | (2009.01) |
| H04W 36/00 | (2009.01) |
| H04W 24/04 | (2009.01) |

(52) U.S. Cl.
CPC ........... *G06F 11/1464* (2013.01); *H04W 4/44* (2018.02); *H04W 8/30* (2013.01); *H04W 36/0011* (2013.01); *H04W 24/04* (2013.01)

(58) Field of Classification Search
CPC ............................... H04L 67/12; H04W 4/40
USPC ........................................................ 711/162
See application file for complete search history.

(56) References Cited

U.S. PATENT DOCUMENTS

| | | | | |
|---|---|---|---|---|
| 2007/0271029 A1* | 11/2007 | Tzamaloukas | ......... | G01C 21/28 701/532 |
| 2010/0198513 A1* | 8/2010 | Zeng | ..................... | B60W 40/02 701/300 |
| 2011/0238987 A1* | 9/2011 | Kherani | ................ | H04L 1/0041 713/168 |
| 2012/0109406 A1* | 5/2012 | Yousefi | ............... | H04L 47/6275 701/1 |
| 2014/0226589 A1* | 8/2014 | Yousefi | .................. | H04N 7/181 370/329 |

(Continued)

OTHER PUBLICATIONS

EPO, Extended European Search Report for European Patent Application No. 19211430.4, dated Mar. 6, 2020, 8 pages.

(Continued)

*Primary Examiner* — Titus Wong
(74) *Attorney, Agent, or Firm* — Burbage Law, P.C.; Jon-Michael Burbage; Elizabeth Ruzich

(57) ABSTRACT

The disclosure includes embodiments for recovering lost data in a vehicular micro cloud. In some embodiments, a method for a connected vehicle that is a member of the vehicular micro cloud includes detecting that one or more data segments of a data set are lost during a first data handover function transmitted over a Vehicle-to-Everything (V2X) network. The data set is partitioned into multiple data segments including the one or more data segments during a previous data handover function performed prior to the first data handover function. The method includes modifying an operation of a communication unit of the connected vehicle to collect the one or more data segments from a set of overhearing vehicles that overhears the one or more data segments during the previous data handover function so that the data set is recovered on the connected vehicle.

20 Claims, 17 Drawing Sheets

(56) References Cited

U.S. PATENT DOCUMENTS

| | | | | |
|---|---|---|---|---|
| 2016/0285935 | A1* | 9/2016 | Wu | H04W 4/90 |
| 2017/0018187 | A1* | 1/2017 | Kim | G08G 1/166 |
| 2017/0099624 | A1* | 4/2017 | Baghel | H04W 36/14 |
| 2017/0142187 | A1* | 5/2017 | Pimentel | H04L 67/06 |
| 2017/0201461 | A1* | 7/2017 | Cheng | H04L 47/286 |
| 2017/0288886 | A1* | 10/2017 | Atarius | H04L 12/1407 |
| 2017/0295579 | A1* | 10/2017 | Sheng | H04W 64/00 |

OTHER PUBLICATIONS

Vila, Arce P., "Hierarchical Routing and Cross-layer Mechanisms for Improving Video Streaming Quality of Service over Mobile Wireless Ad hoc Networks," Doctoral Thesis, Valencia University, retrieved from the Internet: https://riunet.upv.es/bitstream/handle/10251/36538/Arce%20-%20Hierarchical%20routing%20and%20cross-layer%20mechanisms%20for%20improving%20video%20streaming%20quality%20of%20s....pdf?sequence=16, Dec. 21, 2014, 135 pages.
Higuchi, Takamasa et al., "How to Keep Vehicular Micro Cloud Intact," 2018 IEEE 87th Vehicular Technology Conference (VTC Spring), Jun. 3, 2018, pp. 1-5.

* cited by examiner

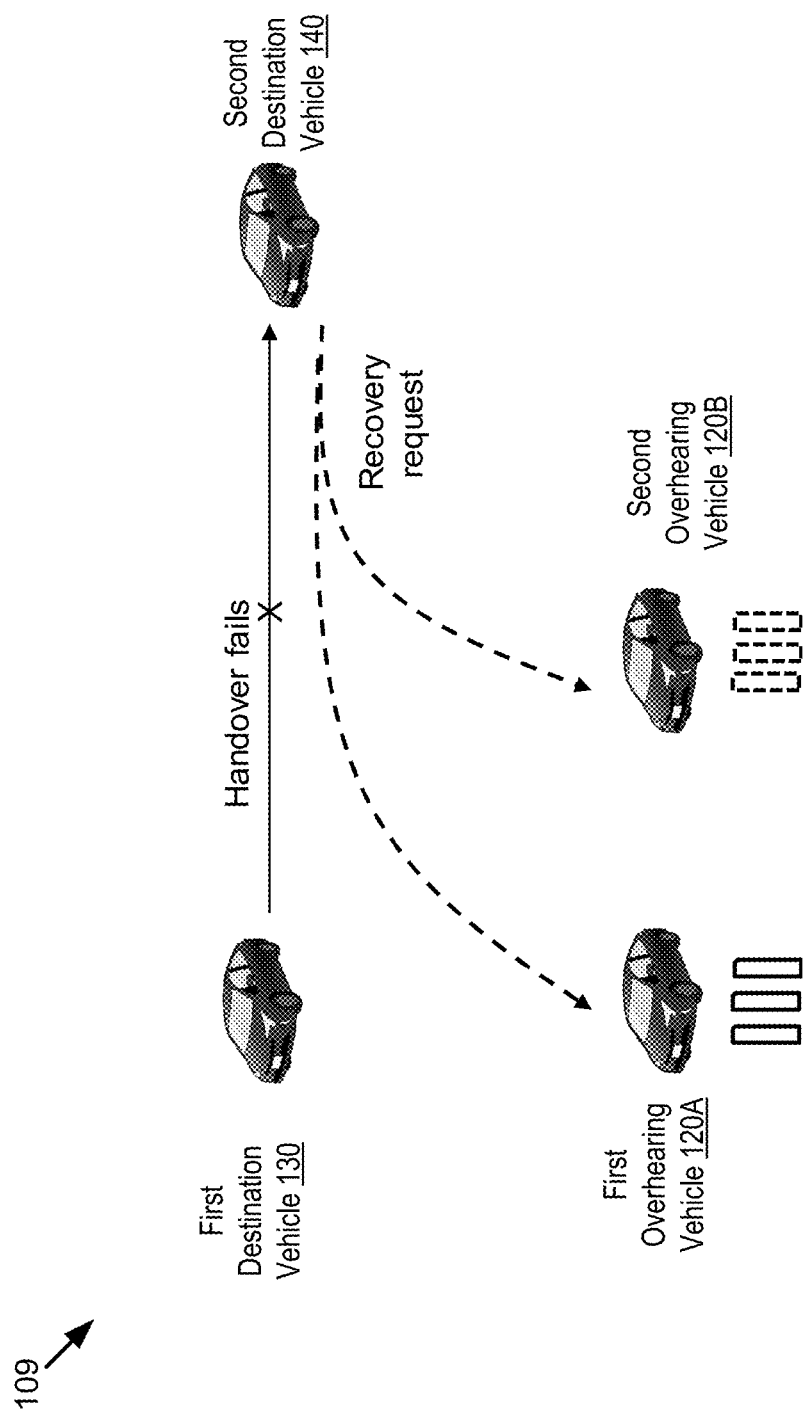

DSRC Data 800

- Vehicles and other client devices equipped with Dedicated Short Range Communication ("DSRC") transmit a Basic Safety Message ("BSM") at a regular interval.

- Each BSM includes the following DSRC data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).
    (5) List Data describing a list of data sets and their constituent data segments. May describe where these data segments are stored within the VMC maintenance system.

Figure 8A

DSRC Data 850

Part 1
Sensor Data including:
(1) GPS Data (local 3D)
- Latitude
- Longitude
- Elevation
- Positional accuracy
- Time (2) Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type
List Data

Figure 8B

LOST DATA RECOVERY FOR VEHICLE-TO-VEHICLE DISTRIBUTED DATA STORAGE SYSTEMS

BACKGROUND

The specification relates to recovering lost data for a Vehicle-to-Everything (V2X) data storage system that includes a vehicular micro cloud.

Cloud computing aids in emerging services for connected and automated driving vehicles, since the vehicles are expected to exchange an increasing amount of data content with remote cloud servers (e.g., by way of cellular networks). Examples of such data content include a three-dimensional road map for automated driving, content for infotainment services, etc. An increasing amount of network traffic between the vehicles and cloud servers may cause a significant load on radio access networks and underlying backbone networks.

Distributed data storage by a cluster of connected vehicles (i.e., a "vehicular micro cloud") is a promising solution to cope with the increasing network traffic generated for and by connected vehicles. Vehicles collaboratively store (or cache) data content in their onboard data storage devices and share the data content over vehicle-to-vehicle (V2V) networks as requested by other vehicles.

SUMMARY

Described are embodiments of a Vehicular Micro Cloud (VMC) maintenance system installed in an onboard unit of a connected vehicle that is capable of recovering lost data for a V2X data storage system including a vehicular micro cloud.

In some embodiments described herein, a vehicular micro cloud includes one or more of the following micro cloud members: a source vehicle; a first destination vehicle; a second destination vehicle; and a set of overhearing vehicles. These micro cloud members are connected vehicles that each include their own instance of the VMC maintenance system. The VMC maintenance system includes code and routines that are operable to execute one or more of the following operations (1)-(12).

Operation (1): The VMC maintenance system of the source vehicle determines that the source vehicle is leaving a geographic area where the vehicular micro cloud is present.

Operation (2): The VMC maintenance system of the source vehicle determines that the source vehicle stores a data set of the vehicular micro cloud.

Operation (3): The VMC maintenance system of the source vehicle partitions the data set into a plurality of data segments. The number of data segments in the data set may be preconfigured. Each data segment may be assigned with a unique identifier so that a particular data segment is distinguishable from another data segment based on its assigned unique identifier. The unique identifier may be specified by one or more bits of data that are stored in a predefined location of the data segment so that the unique identifier for the data segment is readily identifiable by software, hardware, or a combination thereof that knows the location of the one or more bits of data within the data segment.

Operation (4): The VMC maintenance system of the source vehicle determines a first destination vehicle for the data set. The first destination vehicle is a member of the vehicular micro cloud that may store the data set after the source vehicle leaves the geographic area where the vehicular micro cloud is present.

Operation (5): The VMC maintenance system of the source vehicle executes a first data handover function by transmitting the data set to the first destination vehicle via a V2X communication such as Dedicated Short-Range Communication (DSRC), millimeter wave (mmWave), 3G, 4G, 5G, LTE, LTE-V2X, 5G-V2X, etc.

Operation (6): The VMC maintenance system of each overhearing vehicle (in the set of overhearing vehicles) listens to the V2X transmission and overhears one or more data segments of the data set being transmitted. This operation (6) may occur during the execution of the first data handover function (i.e., operation (5)) or any other time when the data set is transmitted to a member of the vehicular micro cloud.

Operation (7): The VMC maintenance system of each overhearing vehicle (in the set of overhearing vehicles) stores all or a subset of the respective data segments that it overhears in its onboard storage.

Operation (8): The VMC maintenance system of the first destination vehicle determines that the first destination vehicle is leaving the geographic area where the vehicular micro cloud is present.

Operation (9): The VMC maintenance system of the first destination vehicle determines a second destination vehicle for the data set. The second destination vehicle is a member of the vehicular micro cloud that may store the data set after the first destination vehicle leaves the geographic area where the vehicular micro cloud is present.

Operation (10): The VMC maintenance system of the first destination vehicle executes a second data handover function by transmitting the data set to the second destination vehicle via a V2X communication.

Operation (11): The VMC maintenance system of any micro cloud member determines that the second data handover function fails. For example, the second destination vehicle does not receive each of the data segments created at operation (3).

Operation (12): The data segments missing from the second destination vehicle are identified and recovered from the set of overhearing vehicles from operations (6) and (7).

The VMC maintenance system described herein can beneficially provide the ability to recover any data content which is lost during a data handover function without keeping many copies of the same data content in a vehicular micro cloud. The VMC maintenance system offers a reasonable trade-off between reliability and efficient utilization of data storage resources. The VMC maintenance system is capable of reliably keeping data contents in a cluster of vehicles within a vehicular micro cloud by way of V2X communications including Vehicle-to-Vehicle (V2V) communications.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for a connected vehicle that is a member of a vehicular micro cloud, including: detecting that one or more data segments of a first data set are lost during a first data handover function transmitted over a Vehicle-to-Everything (V2X) network, where the first data set is partitioned into multiple data segments including the one or more data segments during a previous data handover function performed prior to the first data handover function; and modifying an operation of a communication unit of the connected vehicle to collect the one or more data segments from a set of overhearing vehicles that overhears the one or more data segments during the previous data handover function so that the first data set is recovered on the connected vehicle. Other embodiments of this aspect include corresponding computer systems, apparatus, and computer programs recorded on one or more computer storage devices, each configured to perform the actions of the methods.

Implementations may include one or more of the following features. The method where modifying the operation of the communication unit of the connected vehicle includes modifying one or more operation elements of the communication unit so that the one or more data segments that are lost during the first data handover function are retrieved from the one or more overhearing vehicles by the communication unit. The method where the one or more operation elements of the communication unit include one or more of: one or more active V2X channels to be operated on the communication unit; one or more active V2X radios to be operated on the communication unit; one or more active V2X antennas to be operated on the communication unit; one or more operating frequencies of the one or more active V2X channels; one or more beamforming techniques performed on the one or more active V2X antennas; and a bandwidth allocation scheme of the communication unit. The method where detecting that the one or more data segments of the first data set are lost during the first data handover function includes: constructing a first cluster content list that includes a first aggregated list of data sets and constituent data segments of each data set in the first aggregated list after the first data handover function is performed; and detecting that the one or more data segments of the first data set are lost during the first data handover function based at least in part on the first cluster content list. The method where constructing the first cluster content list after the first data handover function is performed includes: performing a beacon-message exchange process with one or more other members of the vehicular micro cloud after the first data handover function is performed, including (1) transmitting a beacon message including a per-member content list maintained by the connected vehicle to the one or more other members of the vehicular micro cloud via the V2X network and (2) receiving one or more other beacon messages including one or more other per-member content lists from the one or more other members of the vehicular micro cloud; and constructing the first cluster content list to include the per-member content list maintained by the connected vehicle and the one or more other per-member content lists maintained by the one or more other members of the vehicular micro cloud. The method where each per-member content list maintained by a corresponding member of the vehicular micro cloud includes a per-member list of data sets maintained by the corresponding member of the vehicular micro cloud and data segments of each data set in the per-member list after the first data handover function is performed. The method where detecting that the one or more data segments of the first data set are lost during the first data handover function based at least in part on the first cluster content list includes: comparing the first cluster content list with a previous cluster content list to determine that the one or more data segments of the first data set are lost during the first data handover function. The method where the previous cluster content list includes a previous aggregated list of data sets and constituent data segments of each data set in the previous aggregated list. The method where comparing the first cluster content list with the previous cluster content list to determine that the one or more data segments of the first data set are lost during the first data handover function includes: responsive to determining that the one or more data segments are included in the previous cluster content list while missing in the first cluster content list, determining that the one or more data segments are lost during the first data handover function. The method where the first cluster content list is constructed after the first data handover function is performed, and the previous cluster content list is constructed after the previous data handover function is performed while prior to the first data handover function is performed. The method where the first cluster content list is constructed after the first data handover function is performed, and the previous cluster content list is constructed prior to the first data handover function is performed at least by: receiving a V2X wireless message from a source vehicle that partitions the first data set into the multiple data sets, where the V2X wireless message includes data-set identification (ID) data used to identify the first data set and segment ID data used to identify the multiple data segments that constitute the first data set; and constructing the previous cluster content list to include the data-set ID data of the first data set and the segment ID data of the multiple data segments. The method where detecting that the one or more data segments of the first data set are lost during the first data handover function includes: detecting that a request for the first data set fails; and responsive to a failure of the request for the first data set, determining that the one or more data segments of the first data set are lost when the first data handover function is performed. The method where the first data set is encoded into Q coded blocks using a coding technique and each of the Q coded blocks is treated as a data segment so that a probability of successful data recovery for the first data set is improved, where Q is a positive integer. The method where the connected vehicle acts as an overhearing vehicle for a second data set that is transmitted over the V2X network. The method further including: listening to a transmission of the second data set over the V2X network; overhearing an amount of data segments of the second data set transmitted over the V2X network; and storing a number of data segments from the amount of data segments being overheard on the connected vehicle, where the number of data segments being stored include all or a subset of the amount of data segments being overheard. The method where the number of data segments of the second data set overheard and stored by the connected vehicle includes a predetermined number of data segments from the second data set. The method where the number of data segments of the second data set overheard and stored by the connected vehicle includes a dynamic number of data segments from the second data set. The method where the dynamic number of data segments is determined based on one or more of a total number of members in the vehicular micro cloud, availability of a data storage resource on the connected vehicle, a size of the second data set, a data-segment loss ratio in the vehicular micro cloud and feedback data describing a recovery result of the first data set. Implementations of the described techniques may include hardware, a method or process, or computer software on a computer-accessible medium.

One general aspect includes a system including an onboard vehicle computer system of a connected vehicle in a vehicular micro cloud, including a communication unit, a processor and a non-transitory memory storing computer code which, when executed by the processor, causes the processor to: detect that one or more data segments of a first data set are lost during a first data handover function transmitted over a Vehicle-to-Everything (V2X) network, where the first data set is partitioned into multiple data segments including the one or more data segments during a previous data handover function performed prior to the first data handover function; and modify an operation of the communication unit of the connected vehicle to collect the one or more data segments from a set of overhearing vehicles that overhears the one or more data segments during the previous data handover function so that the first data set is recovered on the connected vehicle. Other embodiments of this aspect include corresponding computer systems, apparatus, and computer programs recorded on one or more computer storage devices, each configured to perform the actions of the methods.

Implementations may include one or more of the following features. The system where the connected vehicle acts as an overhearing vehicle for a second data set that is transmitted over the V2X network, and where the computer code, when executed by the processor, causes the processor further to: listen to a transmission of the second data set over the V2X network; overhear an amount of data segments of the second data set transmitted over the V2X network; and store a number of data segments from the amount of data segments being overheard on the connected vehicle, where the number of data segments being stored include all or a subset of the amount of data segments being overheard. Implementations of the described techniques may include hardware, a method or process, or computer software on a computer-accessible medium.

One general aspect includes a computer program product including a non-transitory memory storing computer-executable code that, when executed by a processor, causes the processor to: detect that one or more data segments of a first data set are lost during a first data handover function transmitted over a Vehicle-to-Everything (V2X) network, where the first data set is partitioned into multiple data segments including the one or more data segments during a previous data handover function performed prior to the first data handover function; and modify an operation of the communication unit of the connected vehicle to collect the one or more data segments from a set of overhearing vehicles that overhears the one or more data segments during the previous data handover function so that the first data set is recovered on the connected vehicle. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor further to: listen to a transmission of the second data set over the V2X network; overhear an amount of data segments of the second data set transmitted over the V2X network; and store a number of data segments from the amount of data segments being overheard on the connected vehicle, where the number of data segments being stored include all or a subset of the amount of data segments being overheard. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1E is a block diagram illustrating an example flow process for recovery of lost data based on data segments overheard by the overhearing vehicles of FIG. 1D according to some embodiments.

FIGS. 8A and 8B are graphical representations illustrating example DSRC data according to some embodiments.

DETAILED DESCRIPTION

Figure 1A:
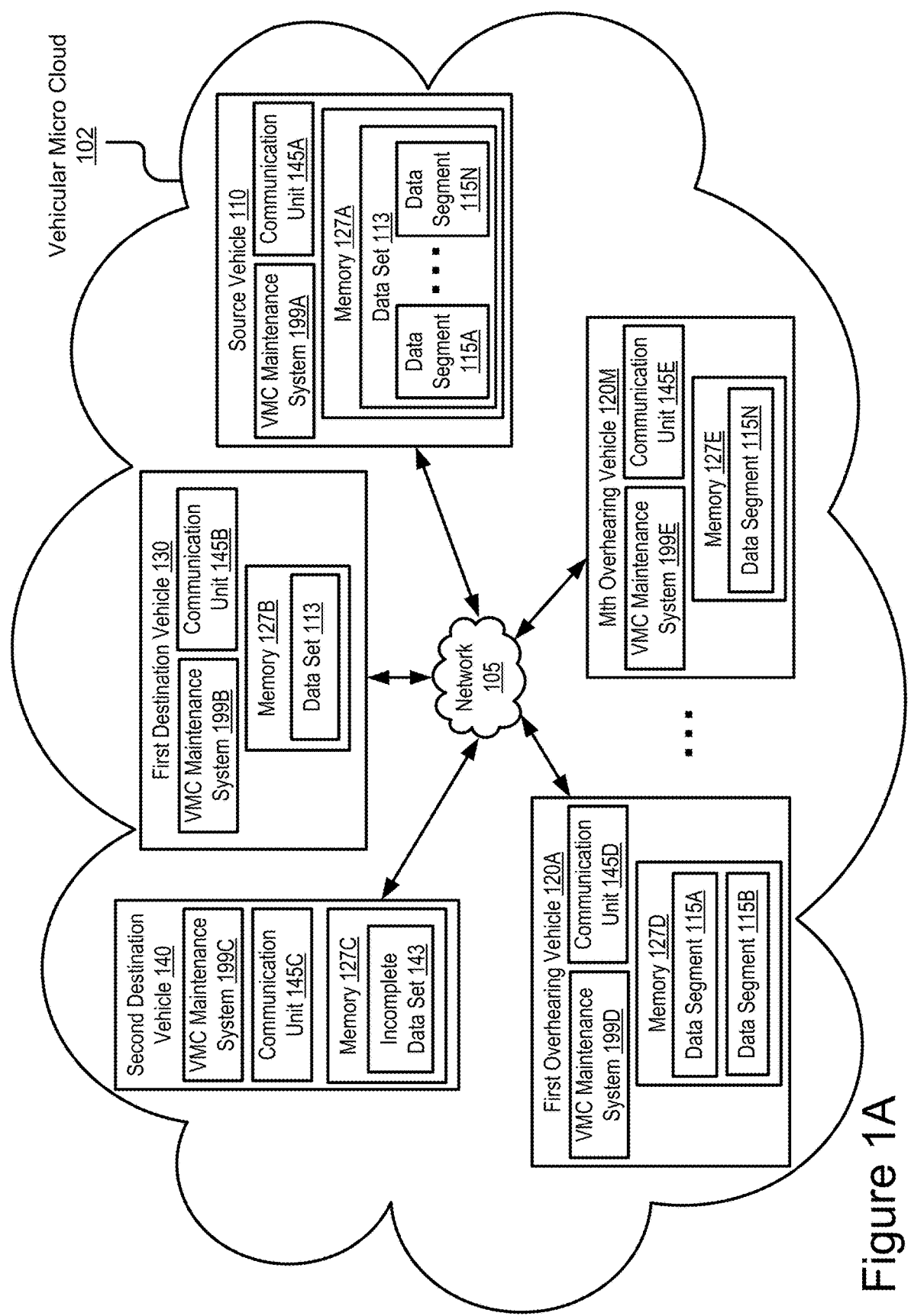
FIG. 1A is a block diagram illustrating an example vehicular micro cloud according to some embodiments.

Connected vehicles that are close by one another can form a vehicular micro cloud and are referred to as "micro cloud members" or "members of the vehicular micro cloud" herein. The connected vehicles collaboratively perform computation, data storage, sensing, communication tasks and any combination thereof among the micro cloud members over V2X (e.g., V2V) networks, including, but not limited to, the following: (1) collaboratively performing resource-intensive computational tasks among the multiple micro cloud members; (2) collaboratively keeping and updating data content among the multiple micro cloud members; (3) collaboratively performing sensing of road conditions by on-board sensors of the multiple micro cloud members; and (4) collaboratively downloading or uploading data content from or to a cloud server (or an edge server).

Using vehicular micro clouds removes the need for the connected vehicles to access remote cloud servers or edge servers by vehicle-to-network (V2N) communications (e.g., by cellular networks) whenever they need to get access to data (e.g., high-definition road map for automated driving). Depending on mobility of the vehicular micro clouds, the vehicular micro clouds can be categorized into two types by way of examples: a stationary vehicular micro cloud; and a mobile vehicular micro cloud.

A stationary vehicular micro cloud can be tied to a certain geographical region (e.g., an intersection). A vehicle joins a stationary vehicular micro cloud when entering a pre-defined geographical region of the stationary vehicular micro cloud and leaves the stationary vehicular micro cloud when exiting from the pre-defined geographical region. When exiting from the pre-defined geographical region, the vehicle also hand overs on-going tasks and data of the stationary vehicular micro cloud to other micro cloud members. In some embodiments, parked vehicles can also be members of the stationary vehicular micro cloud.

In a mobile vehicular micro cloud, a member leader (e.g., a connected vehicle which acts as a leader in the vehicular micro cloud) can invite its neighboring vehicles to join the mobile vehicular micro cloud. Unlike the stationary vehicular micro cloud, the mobile vehicular micro cloud moves as the member leader moves. The member leader recruits other micro cloud members into the mobile vehicular micro cloud and distributes sub-tasks to the other micro cloud members for collaborative task execution.

The data storage functionality provided by a vehicular micro cloud is more challenging to implement than traditional distributed data storage systems on the Internet or computer clusters where network links between data storage nodes are relatively stable. Unlike the traditional distributed storage systems, data storage nodes (i.e., vehicles) in a vehicular micro cloud can frequently join and leave the vehicular micro cloud due to their mobility. In order to keep data contents in a vehicular micro cloud, vehicles that are leaving the vehicular micro cloud need to execute a function to hand over their stored data sets to one or more other vehicles before they leave the vehicular micro cloud, which is referred to as a data handover function.

However, in a vehicular micro cloud, the data handover function is not always performed successfully. For example, a data handover function may fail due to one or more of the following factors: (1) occurrence of packet collisions in wireless channels; and (2) insufficient network connectivity between micro cloud members. If a data handover function fails, data sets may be irretrievably lost from the vehicular micro cloud.

Existing solutions for vehicle-based distributed data storage services can be classified into two categories: (1) geocast-based solutions; and (2) handover-based solutions.

The existing geocast-based solutions repeat geographically-scoped flooding in a region where a vehicular micro cloud is formed so that all the micro cloud members can keep a copy of all the data contents in their data storage. This approach can be considered highly reliable, as all the micro cloud members keep a copy of the same data contents in their on-board data storages. A drawback of this approach is inefficient utilization of data storage resources due to excessive redundancy of data caches.

The existing handover-based solutions assume that data contents are handed over to another alternative vehicle on a unicast basis when a vehicle is leaving the geographical region. This approach enables efficient utilization of data storage resources since only a single or a small number of micro cloud members keep the same and complete data contents. The existing handover-based solutions allow efficient use of data storage resources compared to the geocast-based solutions. However, the data contents can be easily lost from the vehicular micro cloud if a data handover function between micro cloud members fails (e.g., due to packet loss, insufficient contact time between vehicles, etc.).

The VMC maintenance system described herein can provide a mechanism for a vehicular micro cloud to reliably retrieve any data that is lost during an execution of a data handover function. None of the existing solutions includes functionality for each of the following (which is provided by the VMC maintenance system described herein): breaking a data set into data segments; storing the data segments among one or more members of the vehicular micro cloud in an efficient manner so that not all vehicles are required to store a complete copy of the data set; detecting that data segments have been lost while executing a data handover function; and recovering the lost data segments.

In the VMC maintenance system described herein, not all micro cloud members are required to store a complete copy of the entire data set; instead, the data set is broken into data segments and some (though probably not all) of the micro cloud members store some (but not all) of these data segments. This approach of the VMC maintenance system creates an efficiency of data redundancy that is not present in the existing solutions. By comparison, the existing solutions are inadequate because they can only provide data recovery by utilizing non-efficient data recovery methods such as storing complete copies of each data set on every single member of a vehicular micro cloud. This approach in the existing solutions is inefficient and not desirable.

As described herein, a lost data set (or a missing data set) may be referred to as a data set with one or more data segments being lost on a responsible vehicle, where the responsible vehicle is a connected vehicle responsible for maintaining the entire data set in the vehicular micro cloud. The one or more data segments being lost on the responsible vehicle can be referred to as one or more lost data segments or missing data segments. However, the one or more lost data segments may be already cached by a set of overhearing vehicles in the vehicular micro cloud, so that the responsible vehicle or any other member of the vehicular micro cloud can recover the lost data set by retrieving the one or more lost data segments from the set of overhearing vehicles. In some embodiments, the data set is divided into multiple data segments, and the one or more lost data segments may constitute a portion (e.g., 2%, 5%, 10%, 50%, etc.) of the multiple data segments. In some other embodiments, all of the multiple data segments can be lost during a data handover function.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a V2X wireless message described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

Example Overview

Referring to FIG. 1A, depicted is an example vehicular micro cloud 102 which may include one or more connected vehicles. For example, the vehicular micro cloud 102 includes a source vehicle 110, a first destination vehicle 130, a second destination vehicle 140 and a set of overhearing vehicles 120 (e.g., a first overhearing vehicle 120A, ..., and an Mth overhearing vehicle 120M, which may provide similar functionality and are referred to herein as "overhearing vehicle 120" individually or collectively, where M is a positive integer). These connected vehicles of the vehicular micro cloud 102 may be communicatively coupled to a network 105. Optionally, one or more cloud severs (not shown in the figure) are communicatively coupled to the network 105. Optionally, the vehicular micro cloud 102 includes one or more roadside units or other infrastructure devices (not shown in the figure).

In some embodiments, the vehicular micro cloud 102 is a stationary vehicular micro cloud as described by U.S. patent application Ser. No. 15/799,964, the entirety of which is herein incorporated by reference. In some other embodiments, the vehicular micro cloud 102 is a mobile vehicular micro cloud.

Each of the connected vehicles (e.g., the source vehicle 110, the first destination vehicle 130, the second destination vehicle 140 and the overhearing vehicles 120) is a member of the vehicular micro cloud 102 (i.e., "micro cloud member"). These micro cloud members are endpoints of the network 105 (e.g., a V2X network) and communicatively coupled to one another via the network 105. For example, the V2X network is only accessible by members of the vehicular micro cloud 102. Each of these micro cloud members includes its own instance of the VMC maintenance system. For example, the VMC maintenance system is stored in, and executed by, an electronic control unit (ECU) or another onboard unit of a corresponding connected vehicle.

Although one source vehicle, two destination vehicles and two overhearing vehicles and one network 105 are depicted in FIG. 1A, in practice the vehicular micro cloud 102 may include one or more source vehicles, one or more destination vehicles, one or more overhearing vehicles and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 includes a V2X network (e.g., a V2X wireless network). The V2X network is a communication network that enables entities such as members of the vehicular micro cloud 102 to wirelessly communicate with one another via one or more of the following: Wi-Fi; cellular communication including 3G, 4G, LTE, 5G, etc.; Dedicated Short Range Communication (DSRC); millimeter wave communication; etc.

In some embodiments, one or more of the connected vehicles (e.g., the source vehicle 110, the first destination vehicle 130, the second destination vehicle 140 and the overhearing vehicles 120) may be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

The source vehicle 110, the first destination vehicle 130, the second destination vehicle 140 and the overhearing vehicles 120 may include the same or similar elements, with an exception that some of the vehicles store different portions of a data set 113. The source vehicle 110, the first destination vehicle 130, the second destination vehicle 140 and the overhearing vehicles 120 may share a connection or association. For example, the source vehicle 110, the first destination vehicle 130, the second destination vehicle 140 and the overhearing vehicles 120 each include a communication unit such that these vehicles are "connected vehicles," where the communication unit includes any hardware and software that is needed to enable the corresponding vehicle to communicate with one another or other entities via the network 105.

The source vehicle 110, the first destination vehicle 130, the second destination vehicle 140 and the overhearing vehicles 120 may be any type of vehicle. The source vehicle 110, the first destination vehicle 130, the second destination vehicle 140 and the overhearing vehicles 120 may be the same type of vehicle relative to one another or different types of vehicles relative to one another. For example, each of the source vehicle 110, the first destination vehicle 130, the second destination vehicle 140 and the overhearing vehicles 120 may include one of the following types of vehicles: a car; a truck; a sports utility vehicle; a bus; a semi-truck; a drone or any other roadway-based conveyance.

In some embodiments, one or more of the connected vehicles (e.g., the source vehicle 110, the first destination vehicle 130, the second destination vehicle 140 and the overhearing vehicles 120) may include an autonomous vehicle or a semi-autonomous vehicle. For example, one or more of the source vehicle 110, the first destination vehicle 130, the second destination vehicle 140 and the overhearing vehicles 120 may include one or more ADAS systems. The one or more ADAS systems may provide some or all of the functionality that provides autonomous functionality Each of the connected vehicles (e.g., the source vehicle 110, the first destination vehicle 130, the second destination vehicle 140 and the overhearing vehicles 120) is installed with a VMC maintenance system 199. For example, the source vehicle 110 includes a VMC maintenance system 199A, the first destination vehicle 130 includes a VMC maintenance system 199B, the second destination vehicle 140 includes a VMC maintenance system 199C, the first overhearing vehicle 120A includes a VMC maintenance system 199D, and the Mth overhearing vehicle 120M includes a VMC maintenance system 199E. The VMC maintenance systems 199A, 199B, 199C, 199D and 199E are different instances of the VMC maintenance system and may be referred to herein as "VMC maintenance system 199" individually or collectively.

In some embodiments, the VMC maintenance system 199 of a connected vehicle includes software that is operable, when executed by a processor of the connected vehicle, to cause the processor to execute one or more steps of flow processes 107 and 109 and methods 300, 400, 450, 500, 550, 600, 700 and 750 with reference to FIGS. 1D-1E and 3-7B.

In some embodiments, the VMC maintenance system 199 may be implemented using hardware including a field-programmable gate array ("FPGA") or an application-specific integrated circuit ("ASIC"). In some other embodiments, the VMC maintenance system 199 may be implemented using a combination of hardware and software. The VMC maintenance system 199 may be stored in a combination of the devices (e.g., vehicles or other devices), or in one of the devices.

The VMC maintenance system 199 is further described below with reference to FIGS. 1C-7B.

In some embodiments, the source vehicle 110 includes the VMC maintenance system 199, a communication unit 145A and a memory 127A. The first destination vehicle 130 includes the VMC maintenance system 199, a communication unit 145B and a memory 127B. The second destination vehicle 140 includes the VMC maintenance system 199, a communication unit 145C and a memory 127C. The first overhearing vehicle 120A includes the VMC maintenance system 199, a communication unit 145D and a memory 127D. The Mth overhearing vehicle 120M includes the VMC maintenance system 199, a communication unit 145E and a memory 127E.

The communication units 145A, 145B, 145C, 145D and 145E may have similar structures and provide similar functionality and are referred to as "communication unit 145" individually or collectively.

The communication unit 145 transmits and receives data to and from the network 105 or to another communication channel. In some embodiments, the communication unit 145 may include a DSRC transceiver, a DSRC receiver and other hardware or software necessary to make the connected vehicle a DSRC-enabled device. For example, the communication unit 145 includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The memories 127A, 127B, 127C, 127D and 127E may have similar structures and provide similar functionality and are referred to as "memory 127" individually or collectively. Different data may be stored in the memories 127A, 127B, 127C, 127D and 127E. For example, the memory 127A of the source vehicle 110 stores a data set 113, which is partitioned into multiple data segments including a data segment 115A, ... , and a data segment 115N (where N is a positive integer). The memory 127B of the first destination vehicle 130 stores the data set 113 which is partitioned into the multiple data segments. The memory 127C of the second destination vehicle 140 stores an incomplete data set 143, which is an incomplete version of the data set 113 with one or more data segments being missing during a data handover function. The memory 127D of the first overhearing vehicle 120A stores one or more data segments of the data set 113, for example, including the data segment 115A and another data segment 115B. The memory 127E of the Mth overhearing vehicle 120M stores one or more data segments of the data set 113, for example, including the data segment 115N.

The data set 113 is digital data that is stored by the vehicular micro cloud 102 and required to be present in the vehicular micro cloud 102. The VMC maintenance system 199 of the source vehicle 110 is operable, when executed, to cause a processor of the source vehicle 110 to partition the data set 113 into a set of data segments: the data segment 115A, ... , and the data segment 115N. In some embodiments, each of these data segments includes a same number of bits of data, but they may each describe different information. Collectively, the set of data segments describes the data set 113 so that any vehicle that stores all of the data segments also stores the data set 113.

The data set 113 is maintained in the vehicular micro cloud 102. For example, assume that initially the source vehicle 110 is responsible for maintaining the data set 113 in the vehicular micro cloud 102. If the source vehicle 110 is leaving a geographic area that includes the vehicular micro cloud 102, then the VMC maintenance system 199 of the source vehicle 110 needs to distribute the data set 113 to a first other micro cloud member such as the first destination vehicle 130. This distribution is wirelessly achieved via the network 105 by way of V2X communications. Then, when the first destination vehicle 130 is leaving the geographic area, then the VMC maintenance system 199 of the first destination vehicle 130 needs to distribute the data set 113 to a second other micro cloud member such as the second destination vehicle 140. In this way, the data set 113 is kept within the vehicular micro cloud 102.

The memory 127 of a connected vehicle stores instructions or data that may be executed by a processor of the connected vehicle. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. Each connected vehicle may include one or more memories 127.

Figure 1B:
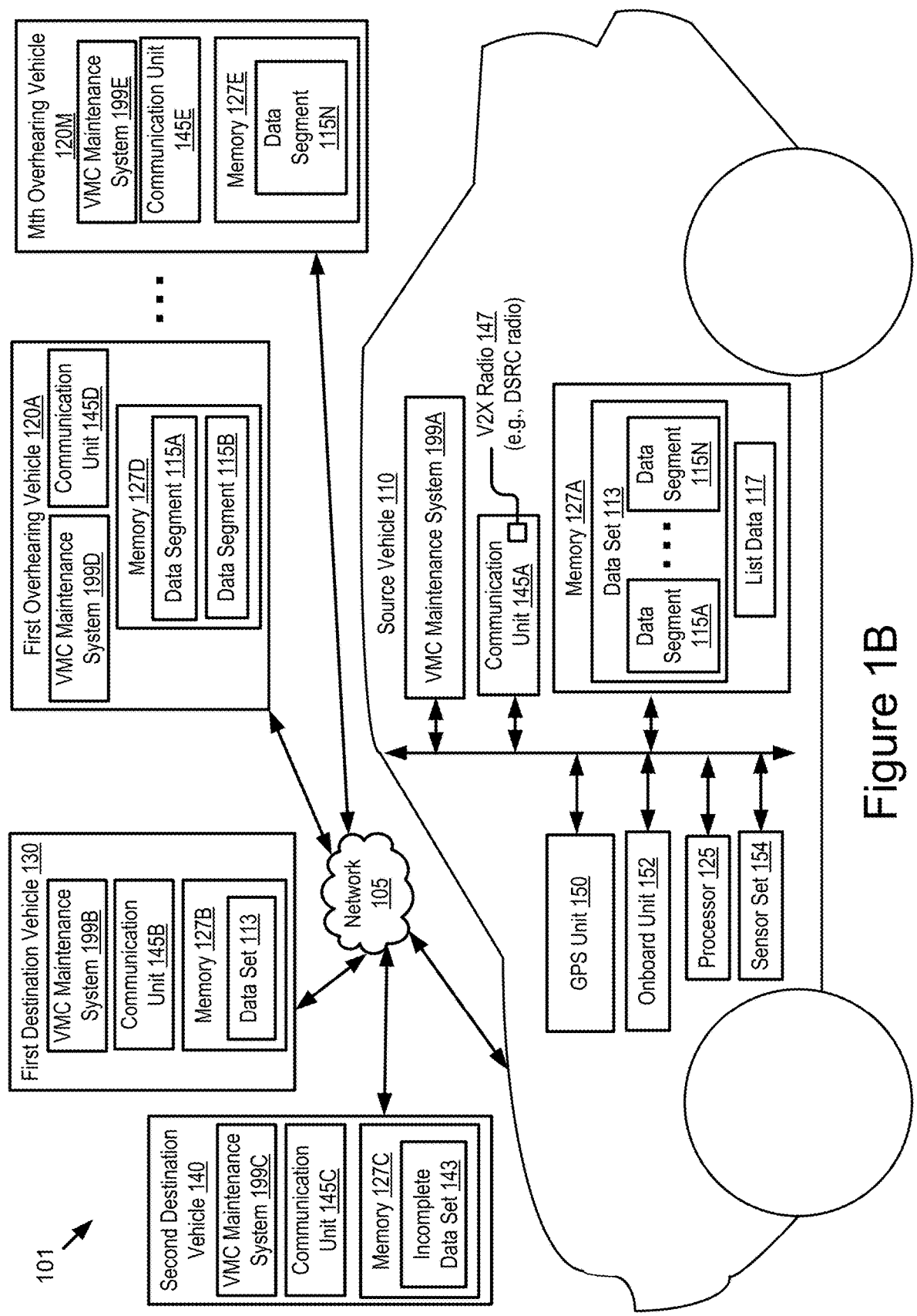
FIG. 1B is a block diagram illustrating an operating environment for a VMC maintenance system according to some embodiments.

Referring to FIG. 1B, depicted is an operating environment 101 for the VMC maintenance system 199. FIG. 1B includes elements similar to those of FIG. 1A, and descriptions for the similar elements are not repeated here.

By way of examples, the source vehicle 110 includes the VMC maintenance system 199A, the communication unit 145A, the memory 127A, a GPS unit 150, an onboard unit 152, a processor 125 and a sensor set 154. Other vehicles in FIG. 1B may have a structure similar to that of the source vehicle 110.

In some embodiments, the communication unit 145A includes a V2X radio 147 used for conducting V2X communications. For example, the V2X radio 147 includes a DSRC radio. In another example, the V2X radio 147 includes hardware, software, or a combination thereof for performing mmWave communications. Other examples of the V2X radio 147 are possible.

The memory 127A stores list data 117 in addition to the data set 113. In some embodiment, the list data 117 includes digital data describing a list of data sets and their constituent data segments. For example, the list data 117 includes digital data describing a per-member content list maintained by the source vehicle 110, where the per-member content list includes a per-member list of data sets maintained by the source vehicle 110 and data segments of each data set in the per-member list. In another example, the list data 117 includes digital data describing a cluster content list maintained by the vehicular micro cloud 102, where the cluster content list includes an aggregated list of data sets and constituent data segments of each data set in the aggregated list. In some embodiments, the cluster content list is constructed by including the per-member content list maintained by the source vehicle 110 as well as other per-member content lists maintained by other members of the vehicular micro cloud 102.

In some embodiments, a per-member content list maintained by a corresponding member of the vehicular micro cloud 102, as well as the cluster content list in the vehicular micro cloud 102, is updated periodically in a predetermined interval.

In some embodiments, the GPS unit 150 is a conventional GPS unit of the source vehicle 110. For example, the GPS unit 150 may include hardware that wirelessly communicates with a GPS satellite to retrieve data that describes a geographic location of the source vehicle 110. For example, the GPS unit 150 retrieves GPS data from one or more GPS satellites. In some embodiments, the GPS unit 150 is a DSRC-compliant GPS unit of the source vehicle 110 that is operable to provide GPS data describing the geographic location of the source vehicle 110 with lane-level accuracy.

The onboard unit 152 can include one or more processors and one or more memories. For example, the onboard unit 152 includes an electronic control unit (ECU). The ECU is an embedded system in automotive electronics that controls one or more of electrical systems or subsystems in the source vehicle 110. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the VMC maintenance system 199 is installed in the onboard unit 152.

The sensor set 154 includes one or more sensors that are operable to measure the roadway environment outside of the source vehicle 110. For example, the sensor set 154 may include one or more sensors that record one or more physical characteristics of the road environment that is proximate to the source vehicle 110. The memory 127A may store sensor data that describes the one or more physical characteristics recorded by the sensor set 154. The roadway environment outside of the source vehicle 110 may include the other connected vehicles in the operating environment 101, and so, one or more sensors of the sensor set 154 may record sensor data that describes information about the other connected vehicles in the operating environment 101.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The source vehicle 110 may include one or more processors 125. Other processors, operating systems, sensors, displays, and physical configurations may be possible.

Figure 1C:
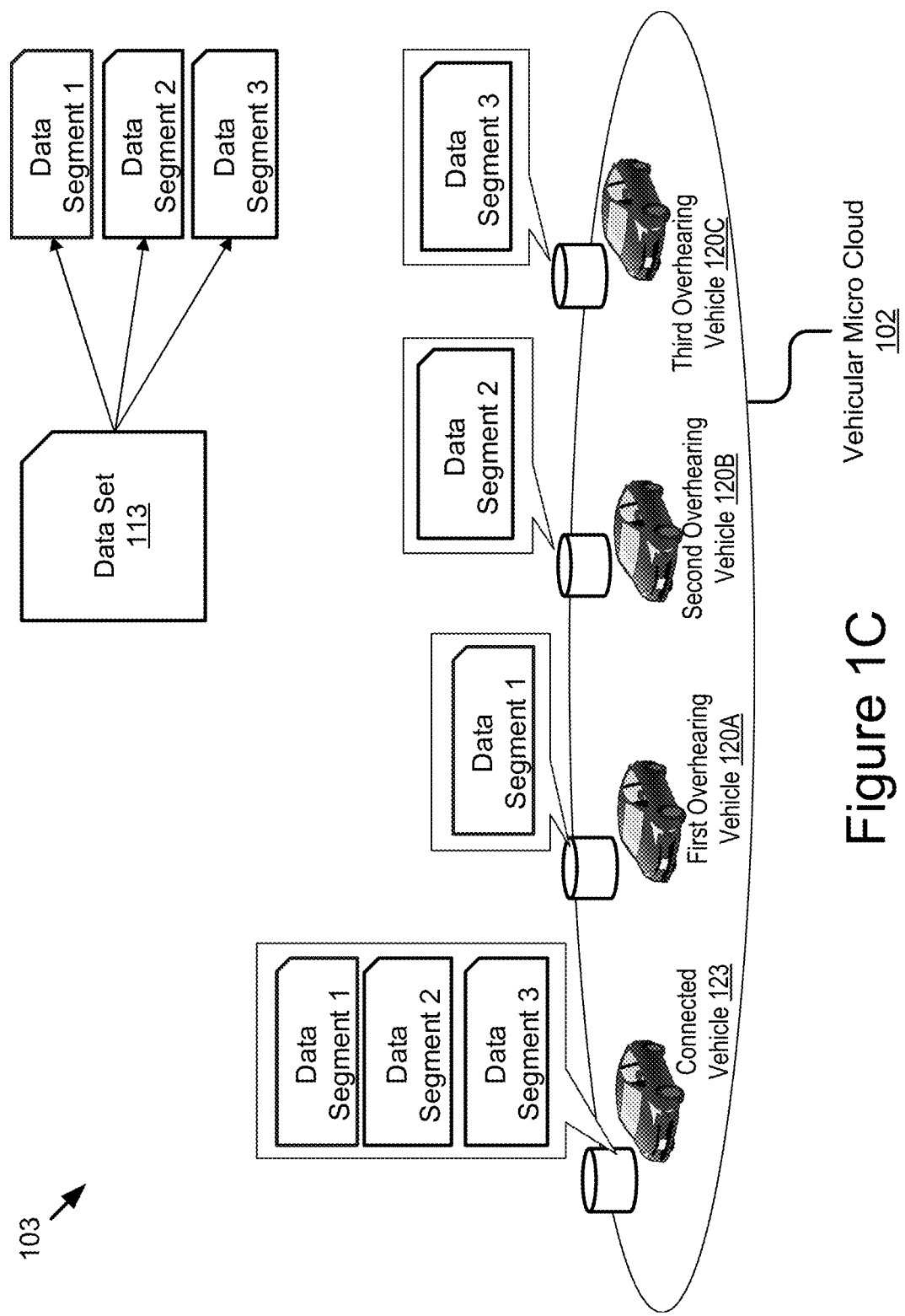
FIG. 1C is another block diagram illustrating an operating environment for a VMC maintenance system according to some embodiments.

Referring to FIG. 1C, another operating environment 103 for the VMC maintenance system 199 is shown according to some embodiments. Each data set stored in the vehicular micro cloud 102 can be divided into multiple data segments. One or more micro cloud members (e.g., only a subset of micro cloud members) in the vehicular micro cloud 102 are responsible for: (1) storing the entire data set; (2) responding to data requests for the data set; and (3) handing over the data set to another micro cloud member when they leave the vehicular micro cloud 102. The one or more micro cloud members can be referred to as "responsible vehicles" for the data set. Meanwhile, one or more other micro cloud members each cache a subset (e.g., only a small subset) of the multiple data segments respectively. The one or more other micro cloud members can be referred to as "overhearing vehicles" for the data set. Thus, even if the micro cloud members that are responsible for storing the entire data set fail to handover the data set, the data set can be recovered by collecting the data segments cached by the one or more other micro cloud members.

In FIG. 1C, the data set 113 is divided into three data segments (e.g., data segment 1, data segment 2 and data segment 3). A connected vehicle 123 in the vehicular micro cloud 102 is responsible for storing the entire data set 113. The first overhearing vehicle 120A listens to a transmission of the data set 113 over a V2X network and overhears, for example, the data segment 1. The first overhearing vehicle 120A caches the data segment 1 in its storage device. Similarly, the second overhearing vehicle 120B also listens to the transmission of the data set 113 over the V2X network and overhears, for example, the data segment 2. The second overhearing vehicle 120B caches the data segment 2 in its storage device. A third overhearing vehicle 120C also listens to the transmission of the data set 113 over the V2X network and overhears, for example, the data segment 3. The third overhearing vehicle 120C caches the data segment 3 in its storage device.

If the connected vehicle 123 fails to hand over the data set 113 to another connected vehicle in the vehicular micro cloud 102 when exiting from the vehicular micro cloud 102, the data set 113 can be recovered by retrieving the data segment 1 from the first overhearing vehicle 120A, the data segment 2 from the second overhearing vehicle 120B and the data segment 3 from the third overhearing vehicle 120C.

In some embodiments, each of the first overhearing vehicle 120A, the second overhearing vehicle 120B and the third overhearing vehicle 120C may overhear more than one data segment of the data set 113. For example, the first overhearing vehicle 120A can overhear the data segment 1 and the data segment 2, while the second overhearing vehicle 120B can overhear the data segment 2 and the data segment 3 and the third overhearing vehicle 120C can overhear the data segment 1 and the data segment 3. In this case, if the connected vehicle 123 fails to hand over the data set 113 to another connected vehicle in the vehicular micro cloud 102 when exiting from the vehicular micro cloud 102, the data set 113 can be recovered by retrieving the data segments from any two of the first, second and third overhearing vehicles (e.g., by retrieving the data segment 1 and the data segment 2 from the first overhearing vehicle 120A and the data segment 3 from the second overhearing vehicle 120B).

Figure 1D:
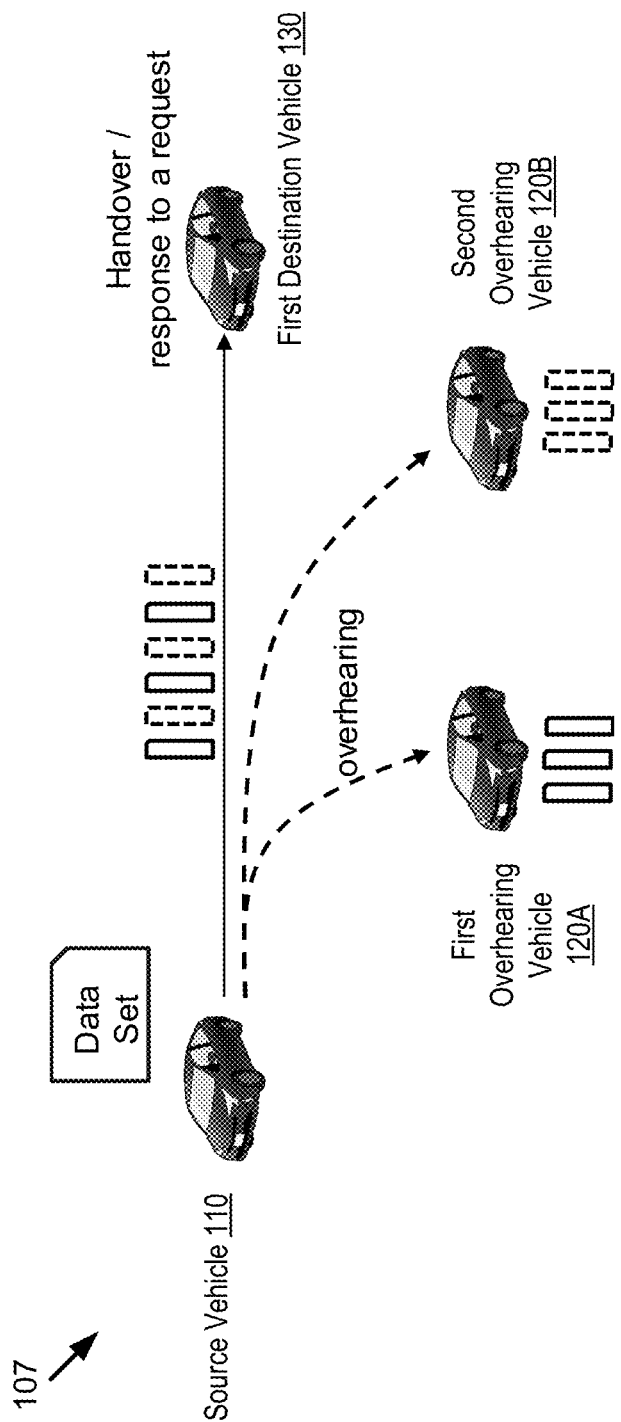
FIG. 1D is a block diagram illustrating an example flow process for partially caching data segments in overhearing vehicles according to some embodiments.

With reference to FIG. 1D, an example flow process 107 for partially caching data segments in overhearing vehicles 120 is shown according to some embodiments. For example, when a data set is handed over from the source vehicle 110 to the first destination vehicle 130 or the data set is requested by the first destination vehicle 130, the source vehicle 110 partitions the data set into multiple data segments. In the example shown in FIG. 1D, the data set is partitioned into 6 data segments. The source vehicle 110 sends the multiple data segments to the first destination vehicle 130 via a V2X network. Meanwhile, one or more overhearing vehicles 120 that are in a communication range of the source vehicle 110 listen to a V2X transmission of the multiple data segments via the V2X network, and each overhears one or more of the multiple data segments. The overheard data segments are stored in the overhearing vehicles 120 respectively to prepare for potential loss of any data segment during the V2X transmission and are not handed over to another micro cloud member again. In the example shown in FIG. 1D, the first overhearing vehicle 120A overhears and caches a first subset of data segments of the data set, and the second overhearing vehicle 120B overhears and caches a second subset of data segments of the data set.

With reference to FIG. 1E, an example flow process 109 for recovery of lost data based on data segments overheard by the overhearing vehicles 120 of FIG. 1D is shown according to some embodiments. For example, when the first destination vehicle 130 of FIG. 1D that has received the multiple data segments of the data set from the source vehicle 110 fails to hand over the multiple data segments to the second destination vehicle 140, any member of the vehicular micro cloud that detects a failure of the handover of the data set can execute a lost-data recovery process to recover the data set. In FIG. 1E, assume that the second destination vehicle 140 detects that the data set is lost in the vehicular micro cloud (or some data segments of the data set are lost in the second destination vehicle 140 that is responsible for maintaining the entire data set, which are referred to as lost data segments or missing data segments), the second destination vehicle 140 can recover the data set by collecting the lost data segments that have been overheard and stored by other micro cloud members at a cost of a certain amount of communication overhead.

For example, the second destination vehicle 140 can broadcast a recovery request for the data set in the vehicular micro cloud. Responsive to receiving the recovery request for the data set, the first overhearing vehicle 120A sends the first subset of data segments overheard by itself to the second destination vehicle 140. Similarly, responsive to receiving the recovery request for the data set, the second overhearing vehicle 120B sends the second subset of data segments overheard by itself to the second destination vehicle 140. In this case, the second destination vehicle 140 can recover the data set by collecting the first subset of data segments from the first overhearing vehicle 120A and the second subset of data segments from the second overhearing vehicle 120B.

In another example, only the first subset of data segments is lost in the second destination vehicle 140 (e.g., the second destination vehicle 140 has successfully received the second subset of data segments during the data handover function). The second destination vehicle 140 can broadcast a recovery request for the first subset of data segments in the vehicular micro cloud. Responsive to receiving the recovery request for the first subset of data segments, the first overhearing vehicle 120A sends the first subset of data segments overheard by itself to the second destination vehicle 140. Because the second overhearing vehicle 120B does not overhear any data segment in the first subset of data segments, the second overhearing vehicle 120B does not respond to the recovery request. In this case, the second destination vehicle 140 can recover the data set by collecting the first subset of data segments from the first overhearing vehicle 120A.

With combined reference to the above-described FIGS. 1D and 1E, a lost-data recovery mechanism to cope with potential failure of a data handover function is described. For example, the source vehicle 110 splits the data set into multiple data segments with a fixed bit size. When (1) a data handover function of the data set is performed between the source vehicle 110 and the first destination vehicle 130 or (2) the data set is requested by the first destination vehicle 130, the source vehicle 110 sends the multiple data segments to the first destination vehicle 130. The first destination vehicle 130 keeps all the received data segments in its local data storage (i.e., "memory"). Other micro cloud members (i.e., "overhearing vehicles 120") within a communication range of the source vehicle 110 overhear the transmitted data segments. Each of the overhearing vehicles 120 caches a subset of the data segments in its local data storage to get ready for potential data loss. Even if a data handover function of the data set fails, the original data set can be (e.g., probabilistically) recovered by collecting the cached data segments from the overhearing vehicles 120.

An example communication process between the VMC maintenance systems 199 of the connected vehicles (e.g., the source vehicle 110, the first destination vehicle 130, the second destination vehicle 140 and the overhearing vehicles 120) are described here. In some embodiments, the VMC maintenance systems of the connected vehicles are operable, when executed by a corresponding processor, to execute one or more of the following operations (1)-(12).

Operation (1): The VMC maintenance system 199 of the source vehicle 110 determines that the source vehicle 110 exits from the vehicular micro cloud 102 (e.g., the source vehicle 110 is leaving a geographic area where the vehicular micro cloud 102 is present).

Operation (2): The VMC maintenance system 199 of the source vehicle 110 determines that the source vehicle 110 stores a data set.

Operation (3): The VMC maintenance system 199 of the source vehicle 110 partitions the data set into multiple data segments. The number of data segments may be preconfigured. Each data segment may be assigned with a unique identifier so that a particular data segment is distinguishable from another data segment based on its assigned unique identifier. The unique identifier may be specified by one or more bits of data that are stored in a predefined location of the data segment so that the unique identifier for the data segment is readily identifiable by software, hardware, or a combination there of that knows the location of the bits of data within the data segment.

Operation (4): The VMC maintenance system 199 of the source vehicle 110 determines a first destination vehicle 130 for the data set. The first destination vehicle 130 is a member of the vehicular micro cloud 102 that may store the data set after the source vehicle 110 leaves the geographic area where the vehicular micro cloud 102 is present.

Operation (5): The VMC maintenance system 199 of the source vehicle 110 executes a first data handover function by transmitting the data set to the first destination vehicle 130 via a V2X communication such as DSRC, mmWave, 3G, 4G, 5G, LTE, LTE-V2X, 5G-V2X, etc.

Operation (6): The VMC maintenance system 199 of each overhearing vehicle 120 in a set of overhearing vehicles 120 within a communication range of the source vehicle 110 listens to the V2X transmission of the data set and overhears one or more of the data segments being transmitted (e.g., but not all of the data segments) so that each overhearing vehicle 120 does not store the entire data set. For example, each overhearing vehicle 120 may overhear part of the data segments in the entire data set. Alternatively, each overhearing vehicle 120 may overhear all the data segments in the data set. However, the VMC maintenance system 199 is programmed so that it only stores a predetermined number of data segments out of all the overheard data segments. This predetermined number may be static or dynamic. A static predetermined number is one which is hard coded into the software or hardware of the VMC maintenance system 199 (e.g., three data segments, or some other number of data segments statically defined by the code and routines of the VMC maintenance system 199). A predetermined number is dynamic if it varies based on, for example, the number of the connected vehicles that are members of the vehicular micro cloud.

This operation (6) may occur during the execution of the first data handover function (i.e., operation (5)) or any other time when the data set is transmitted to a member of the vehicular micro cloud.

Operation (7): The VMC maintenance system 199 of each overhearing vehicle 120 stores all or a subset of the corresponding overheard data segments in its onboard storage.

Operation (8): The VMC maintenance system 199 of the first destination vehicle 130 determines that the first destination vehicle 130 exits from the vehicular micro cloud 102 (e.g., the first destination vehicle 130 is leaving the geographic area where the vehicular micro cloud 102 is present).

Operation (9): The VMC maintenance system 199 of the first destination vehicle 130 determines a second destination vehicle 140 for the data set. The second destination vehicle 140 is a member of the vehicular micro cloud 102 that may store the data set after the first destination vehicle 130 leaves the geographic area where the vehicular micro cloud 102 is present.

Operation (10): The VMC maintenance system 199 of the first destination vehicle 130 executes a second data handover function by transmitting the data set to the second destination vehicle 140 via a V2X communication.

Operation (11): The VMC maintenance system 199 of any micro cloud member may determine that the second data handover function fails. For example, the second destination vehicle 140 does not receive each of the data segments created at operation (3).

In some embodiments, some or all of the micro cloud members store list data that includes digital data describing a cluster content list, where the cluster content list includes an aggregated list of data sets and constituent data segments for each data set in the aggregated list. The cluster content list can be used to identify when a data handover event (or some other data transmission) has failed. In this way, any micro cloud member that overhears a data transmission may detect that a failure has occurred and that operation (12) needs to be implemented so that the missing data set is recovered. The list data may also describe where the data segments are stored.

In some embodiments, the cluster content list includes one or more per-member content lists maintained by one or more micro cloud members in the vehicular micro cloud, where a per-member content list maintained by a corresponding micro cloud member includes a per-member list of data sets maintained by the corresponding micro cloud member and constituent data segments of each data set in the per-member list. For example, the cluster content list includes all the per-member content lists of all members of the vehicular micro cloud, and the cluster content list is a cloud-wide content list. In another example, the cluster content list includes per-member content lists of part of the members of the vehicular micro cloud.

In some embodiments, the per-member content lists as well as the cluster content list in the vehicular micro cloud 102 can be updated periodically in a predetermined interval.

In some embodiments, when a connected vehicle exits from the vehicular micro cloud 102, the connected vehicle performs a data handover function to hand over data sets stored in the connected vehicle to one or more other destination vehicles. At operation (3), the connected vehicle also creates its own per-member content list that includes the list of the data sets maintained by the connected vehicle itself and constituent data segments for each data set and distributes the per-member content list among other micro cloud members. For example, a DSRC message (e.g., a Basic Safety Message) created by the source vehicle 110 may be used to distribute the per-member content list of the source vehicle 110 among the micro cloud members. See, e.g., FIGS. 8A-8B in which DSRC data which is transmitted via a DSRC message includes "list data" that describes the list of data sets and their constituent data segments. Accordingly, in some embodiments the memories of the vehicles store DSRC data that includes the list data.

Operation (12): The data segments missing from the second destination vehicle 140 are identified and recovered from the set of overhearing vehicles 120 from operations (6) and (7).

In some embodiments, the operations (1)-(12) described above are capable of recovering a lost data set if all the data segments are cached by any micro cloud members. Possibility of successful data recovery for a data set can be improved by incorporating coding techniques (e.g., erasure coding, network coding, etc.) into the transmission of the data set. For example, when a connected vehicle sends a data set, it encodes the data set into Q coded blocks using a coding technique, such that the original data set can be recovered as long as P (P<Q) out of the Q coded blocks are received. The connected vehicle then treats each of the Q coded blocks as a data segment and transmits the Q coded blocks in a form of the multiple data segments via the V2X network. Here, P and Q are positive integers.

Example Computer System

Figure 2:
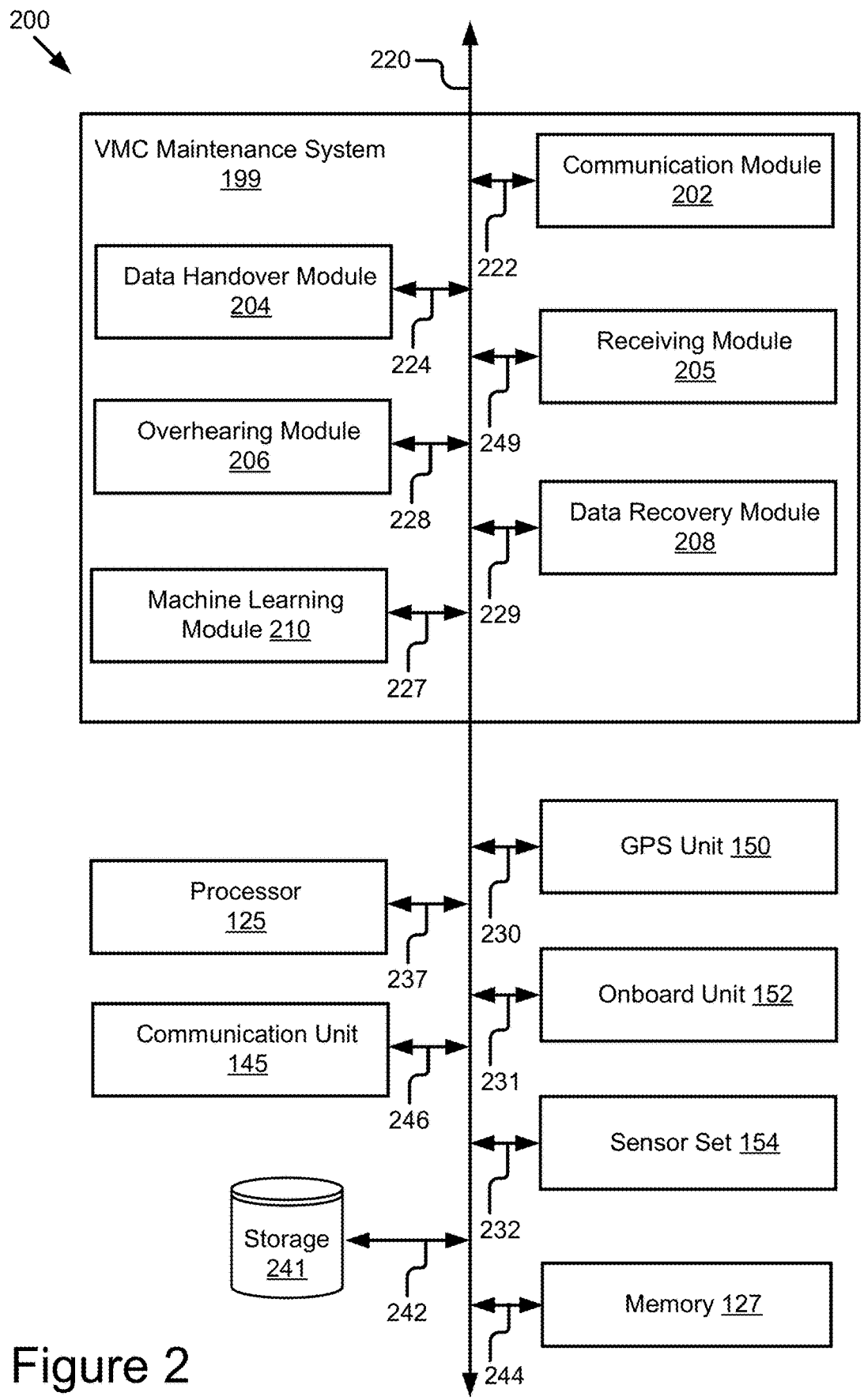
FIG. 2 is a block diagram illustrating an example computer system including a VMC maintenance system according to some embodiments.

Referring now to FIG. 2, depicted is a block diagram illustrating an example computer system 200 including the VMC maintenance system 199 according to some embodiments. In some embodiments, the computer system 200 may include a special-purpose computer system that is programmed to perform one or more steps of methods 300, 400, 450, 500, 550, 600, 700 and 750 described below with reference to FIGS. 3-7B.

In some embodiments, the computer system 200 is an on-board vehicle computer of a connected vehicle. In some embodiments, the computer system 200 is an onboard unit of the connected vehicle. In some embodiments, the computer system 200 is an electronic control unit (ECU), head unit or some other processor-based computing device of the connected vehicle.

The computer system 200 may include one or more of the following elements according to some examples: the VMC maintenance system 199; the processor 125; the memory 127; the communication unit 145; the GPS unit 150; the onboard unit 152, the sensor set 154 and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The GPS unit 150 is communicatively coupled to the bus 220 via a signal line 230. The onboard unit 152 is communicatively coupled to the bus 220 via a signal line 231. The sensor set 154 is communicatively coupled to the bus 220 via a signal line 232. The storage 241 is communicatively coupled to the bus 220 via a signal line 242. The memory 127 is communicatively coupled to the bus 220 via a signal line 244.

The processor 125, the memory 127, the communication unit 145, the GPS unit 150, the onboard unit 152 and the sensor set 154 are described above with reference to FIGS. 1A-1B, and so, similar description will not be repeated here. The memory 127 may store any of the data described above with reference to FIGS. 1A-1E. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the VMC maintenance system 199 includes: a communication module 202; a data handover module 204; a receiving module 205; an overhearing module 206; a data recovery module 208; and a machine learning module 210. These components of the VMC maintenance system 199 are communicatively coupled to each other via the bus 220. In some embodiments, components of the VMC maintenance system 199 can be stored in a single device. In some other embodiments, components of the VMC maintenance system 199 can be distributed and stored across multiple devices. For example, some of the components of the VMC maintenance system 199 may be distributed across the members of the vehicular micro cloud 102.

The communication module 202 can be software including routines for handling communications between the VMC maintenance system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 101 or 103. For example, the communication module 202 receives or transmits, via the communication unit 145, one or more of the following elements: data sets (each in form of multiple data segments); and list data. The communication module 202 may send or receive any of the data or messages described above with reference to FIGS. 1A-1E via the communication unit 145.

In some embodiments, the communication module 202 receives data from components of the VMC maintenance system 199 and stores the data in one or more of the storage 241 and the memory 127. For example, the communication module 202 receives data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the VMC maintenance system 199. For example, the communication module 202 may handle communications among the data handover module 204, the receiving module 205, the overhearing module 206, the data recovery module 208 and the machine learning module 210. Any of these modules may cause the communication module 202 to communicate with the other elements of the computer system 200 or the operating environment 101 or 103 (via the communication unit 145).

The data handover module 204 can be software including routines for performing a data handover function for a data set. In some embodiments, the data handover module 204 can be stored in the memory 127 of the computer system 200 and can be accessible and executable by the processor 125. The data handover module 204 may be adapted for cooperation and communication with the processor 125 and other components of the computer system 200 via a signal line 224.

In some embodiments, the connected vehicle is responsible for maintaining a data set that is kept in the vehicular micro cloud 102. The data handover module 204 determines that the connected vehicle exits from the vehicular micro cloud 102 and determines to hand over the data set to another connected vehicle in the vehicular micro cloud. Alternatively, the data handover module 204 determines that a request for the data set is received from the other connected vehicle. Responsive to determining that the connected vehicle exits from the vehicular micro cloud 102 or responsive to receiving the request for the data set, the data handover module 204 executes a data handover function to transmit the data set to the other connected vehicle via the V2X network. The data handover module 204 partitions the data set into multiple data segments and transmits the multiple data segments to the other connected vehicle. When the other connected vehicle receives the multiple data segments, the other connected vehicle becomes responsible for maintaining the data set in the vehicular micro cloud 102.

In some embodiments, the number of data segments in the data set may be preconfigured. In some other embodiments, the number of data segments in the data set may be determined dynamically. For example, the number of data segments in the data set may be determined based on one or more of the following factors: (1) a size of the data set (e.g., a data set with a larger size can be divided into more data segments); and (2) one or more overhearing vehicles 120 within a communication range of the connected vehicle. For example, if each overhearing vehicle 120 overhears a fixed number of data segments and there are a larger number of overhearing vehicles 120 within a communication range of the connected vehicle, the data set can be divided into a larger number of data segments. As a result, the data set can be overheard by and distributed to more overhearing vehicles 120, which may reduce an overall size of the overheard data segments to be cached in each overhearing vehicle 120.

In some embodiments, each data segment in the data set may have a same size or a fixed size. In some other embodiments, data segments in the data set may have different sizes.

In some embodiments, each data segment may be assigned with a unique identifier so that a particular data segment is distinguishable from another data segment based on its assigned unique identifier. The unique identifier may be specified by one or more bits of data that are stored in a predefined location of the data segment so that the unique identifier for the data segment is readily identifiable by software, hardware, or a combination thereof that knows the location of the one or more bits of data within the data segment.

In some embodiments, before transmitting the data set, the data handover module 204 encodes the data set into Q coded blocks using a coding technique (e.g., an erasure coding technique, a network coding technique, etc.) and then treats each of the Q coded blocks as a data segment so that a probability of successful data recovery for the data set is improved in the vehicular micro cloud 102, where Q is a positive integer. For example, the original data set can be recovered at a receiver of the data set even if only P out of the Q coded blocks are received at the receiver, where P is a positive integer and P<Q.

The receiving module 205 can be software including routines that, when executed by the processor 125, cause the processor 125 to receive a data set sent to the connected vehicle. In some embodiments, the receiving module 205 can be a set of instructions stored in the memory 127 of the computer system 200 and can be accessible and executable by the processor 125. The receiving module 205 may be adapted for cooperation and communication with the processor 125 and other components of the computer system 200 via a signal line 249.

In some embodiments, the receiving module 205 of the connected vehicle is operable to receive, via the communication unit 145, a data set whose destination is the connected vehicle. For example, another connected vehicle performs a data handover function to hand over the data set to the connected vehicle. As a result, the receiving module 205 of the connected vehicle receives multiple data segments of the data set from the other connected vehicle and becomes responsible for maintaining the data set in the vehicular micro cloud 102. The receiving module 205 may add a data-set identifier of the data set and segment identifiers of its constituent data segments into a per-member content list of the connected vehicle.

In another example, the connected vehicle has requested for the data set from the other connected vehicle. In this case, the other connected vehicle determines if it (i) hand overs a responsibility to maintain the data set to the connected vehicle or (ii) keeps the responsibility by itself while sending a copy of the data set to the connected vehicle. As a result, the receiving module 205 of the connected vehicle receives multiple data segments of the data set from the other connected vehicle. Depending on the decision by the other connected vehicle, the connected vehicle may or may not become responsible for maintaining the data set in the vehicular micro cloud 102. For example, if the other connected vehicle has made a decision to hand over a responsibility of maintaining the data set to the connected vehicle, then the connected vehicle becomes responsible for maintaining the data set in the vehicular micro cloud 102. The receiving module 205 of the connected vehicle may add a data-set identifier of the data set and segment identifiers of its constituent data segments into a per-member content list of the connected vehicle. In another example, if the other connected vehicle has made a decision to keep the responsibility by itself while sending a copy of the data set to the connected vehicle, the connected vehicle is not responsible for maintaining the data set in the vehicular micro cloud 102.

In some embodiments, the receiving module 205 determines whether all the data segments of the data set are received. If all the data segments of the data set are received, the receiving module 205 stores all the data segments of the data set in an associated storage. If one or more of the data segments are lost, the receiving module 205 may instruct the data recovery module 208 described below to retrieve the one or more lost data segments from a set of overhearing vehicles 120 that has overheard the one or more lost data segments so that the one or more lost data segments are recovered in the connected vehicle.

The overhearing module 206 can be software including routines that, when executed by the processor 125, cause the processor 125 to listen to a V2X transmission of a data set and overhear one or more data segments of the data set. In some embodiments, the overhearing module 206 can be a set of instructions stored in the memory 127 of the computer system 200 and can be accessible and executable by the processor 125. The overhearing module 206 may be adapted for cooperation and communication with the processor 125 and other components of the computer system 200 via a signal line 228.

In some embodiments, the connected vehicle acts as an overhearing vehicle that is within a communication range of a first other connected vehicle, where the first other connected vehicle transmits a data set to a second other connected vehicle. The overhearing module 206 is operable to: listen to a transmission of the data set over the V2X network; overhear an amount of data segments of the data set transmitted over the V2X network; and store, on the connected vehicle, a number of data segments from the amount of data segments of the data set being overheard. For example, the overhearing module 206 overhears the V2X transmission of the data set, randomly picks up a subset of the data segments and caches the subset of the data segments in a local data storage of the connected vehicle. The caching of the overheard data segments in an overhearing vehicle can be referred to as partial caching of the data set.

In some embodiments, the number of data segments of the data set overheard and stored by the connected vehicle includes a predetermined number of data segments from the data set. For example, the receiving module 206 picks up a pre-defined number or a pre-defined proportion of the transmitted data segments of the data set.

Alternatively, the number of data segments of the data set overheard and stored by the connected vehicle includes a dynamic number of data segments from the data set. The overhearing module 206 determines a dynamic number of data segments (e.g., the overhearing module 206 picks up a variable number or a variable proportion of data segments of the data set) based on one or more of the following factors: (1) a total number of members in the vehicular micro cloud 102; (2) availability of a data storage resource on the connected vehicle; (3) a size of the data set; (4) a data-segment loss ratio in the vehicular micro cloud 102; and (5) feedback data describing recovery results of data sets in the vehicular micro cloud 102.

For example, if there are more members in the vehicular micro cloud 102, which means that there are more candidate overhearing vehicles for the data set, each overhearing vehicle 120 can pick up a smaller number of data segments. In another example, if the connected vehicle has sufficient storage space, the overhearing module 206 can pick up a larger number of data segments of the data set. In yet another example, if the size of the data set exceeds a first threshold, which means that the number of data segments of the data set exceeds a second threshold (here assume that each data segment has a fixed size), the overhearing module 206 can pick up a larger number of data segments of the data set. In yet another example, if a data-segment loss ratio in the vehicular micro cloud 102 is high, which means that the data segments of the data set are easily to get lost during a data handover function, the overhearing module 206 can pick up a larger number of data segments for the data set to cope with potential loss of the data set.

In yet another example, if feedback data describing recovery results of data sets in the vehicular micro cloud 102 indicates that an average time duration for recovering a data set in the vehicular micro cloud 102 exceeds a threshold, which means that the recovery of data sets in the vehicular micro cloud 102 is slow, the overhearing module 206 can pick up a larger number of data segments for the data set. In this way, each overhearing vehicle 120 overhears more data segments for the data set, and a complete list of the data segments can be retrieved from less overhearing vehicles 120 so as to reduce a response time for the data recovery. For example, if some data segments are lost in the data set, the data set can be recovered by collecting the lost data segments from less overhearing vehicles 120.

If a data storage space allocated for the partial caching is full, the overhearing module 206 is operable to remove some of the previously-cached data segments (i.e., cache replacement). The data segments to be replaced are selected based on a pre-defined policy (e.g., random selection, removing the oldest data segments, etc.).

The overhearing module 206 is further described below with reference to FIGS. 7A-7B.

The data recovery module 208 can be software including routines that, when executed by the processor 125, cause the processor 125 to perform a data recovery process for a data set. In some embodiments, the data recovery module 208 can be a set of instructions stored in the memory 127 of the computer system 200 and can be accessible and executable by the processor 125. The data recovery module 208 may be adapted for cooperation and communication with the processor 125 and other components of the computer system 200 via a signal line 229.

In some embodiments, the connected vehicle is responsible for maintaining a data set, where one or more data segments of the data set are lost during a data handover function and other data segments of the data set are stored in the connected vehicle. The data recovery module 208 of the connected vehicle performs a data recovery process to recover the data set maintained by the connected vehicle. For example, the data recovery module 208 recovers the one or more lost data segments for the data set from a set of overhearing vehicles 120 so that the entire data set is kept in the connected vehicle.

In some other embodiments, the data set is maintained by another connected vehicle in the vehicular micro cloud 102, where one or more data segments of the data set are lost during a data handover function and other data segments of the data set are stored in the other connected vehicle. The connected vehicle that performs a data recovery process for the data set collects all the data segments of the data set from members of the vehicular micro cloud 102. For example, the data recovery module 208 of the connected vehicle recovers the one or more lost data segments for the data set from a set of overhearing vehicles 120 and collects the other data segments of the data set from the other connected vehicle that is responsible for maintaining the data set in the vehicular micro cloud 102. In another example, the data recovery module 208 collects all the data segments including the one or more lost data segments for the data set from the set of overhearing vehicles 120. After collecting all the data segments of the data set, the connected vehicle becomes responsible for maintaining the data set in the vehicular micro cloud 102 and stores the data set in a storage of the connected vehicle.

For example, the data recovery module 208 is operable to detect that one or more data segments of a data set are lost during a first data handover function transmitted over a V2X network, where the data set is partitioned into multiple data segments including the one or more data segments during a previous data handover function performed prior to the first data handover function. The data recovery module 208 is operable to modify an operation of the communication unit 145 of the connected vehicle to collect the one or more lost data segments from a set of overhearing vehicles 120 that overhears the one or more data segments during the previous data handover function (e.g., the modification of the operation of the communication unit 145 is described below in more detail). As a result, the data set is recovered on the connected vehicle.

In some embodiments, the data recovery module 208 takes a proactive approach to perform the data recovery process for the data set. In the proactive approach, each micro cloud member repeatedly transmits a beacon message including a per-member content list in a pre-defined interval (e.g., the per-member content list including a per-member list of data sets and constituent data segments of each data set in the per-member list maintained by the corresponding micro cloud member). The beacon-message exchange allows all the micro cloud members to be aware of a cluster content list (including an aggregated list of data sets and constituent data segments of each data set in the aggregated list) that are currently kept in the vehicular micro cloud 102. The cluster content list is updated periodically in the pre-defined interval. If a data set is lost from the vehicular micro cloud (e.g., due to failure of a data handover function), any micro cloud member can detect the loss of the data set by comparing a current cluster content list at a current timestamp with a previous cluster content list at a previous timestamp. When a micro cloud member finds that a data set is lost, it attempts to recover the original data set by requesting other micro cloud members for cached data segments.

Specifically, in the proactive approach, the data recovery module 208 detects that one or more data segments of the data set are lost during the first data handover function at least by: (1) constructing a first cluster content list that includes a first aggregated list of data sets and constituent data segments of each data set in the first aggregated list after the first data handover function is performed; and (2) detecting that the one or more data segments of the data set are lost during the first data handover function based at least in part on the first cluster content list.

For example, the data recovery module 208 performs a beacon-message exchange process with one or more other members of the vehicular micro cloud 102 after the first data handover function is performed, including: (1) transmitting a beacon message including a per-member content list maintained by the connected vehicle to the one or more other members of the vehicular micro cloud 102 via the V2X network; and (2) receiving one or more other beacon messages including one or more other per-member content lists from the one or more other members of the vehicular micro cloud. The data recovery module 208 constructs the first cluster content list to include the per-member content list maintained by the connected vehicle and the one or more other per-member content lists maintained by the one or more other members of the vehicular micro cloud 102. In some embodiments, each per-member content list maintained by a corresponding member of the vehicular micro cloud includes a per-member list of data sets maintained by the corresponding member of the vehicular micro cloud and data segments of each data set in the per-member list after the first data handover function is performed.

Next, the data recovery module 208 compares the first cluster content list with a previous cluster content list to determine that the one or more data segments of the data set are lost during the first data handover function. For example, the previous cluster content list includes a previous aggregated list of data sets and constituent data segments of each data set in the previous aggregated list. The data recovery module 208 compares the first cluster content list with the previous cluster content list to determine that the one or more data segments are included in the previous cluster content list while missing in the first cluster content list. Then, the data recovery module 208 determines that the one or more data segments are lost during the first data handover function and collects the one or more lost data segments from a set of overhearing vehicles 120 as well as other data segments of the data set from other members of the vehicular micro cloud 102. Of course, in some embodiments, the data recovery module 208 can also collect the other data segments from the set of overhearing vehicles 120.

In some examples, the first cluster content list is constructed after the first data handover function is performed, and the previous cluster content list is constructed after the previous data handover function is performed while prior to the first data handover function is performed. For example, with reference to FIG. 9, the previous data handover function is performed at a previous data-handover timestamp 901, and the previous cluster content list is a cluster content list of the vehicular micro cloud 102 constructed at a previous timestamp 902 prior to execution of the first data handover function at a first data-handover timestamp 903. The first cluster content list is a cluster content list of the vehicular micro cloud 102 constructed at a first timestamp 905 after the first data handover function is performed.

In some examples, the first cluster content list is constructed after the first data handover function is performed. Prior to the first data handover function is performed, the previous cluster content list is constructed at least by: (1) receiving a V2X wireless message from a source vehicle 110 that partitions the data set into the multiple data sets, where the V2X wireless message includes (a) data-set identification (ID) data used to identify the data set and (b) segment ID data used to identify the multiple data segments that constitute the data set; and (2) constructing the previous cluster content list to include the data-set ID data of the data set and the segment ID data of the multiple data segments.

The proactive approach to perform the data recovery process is described further below with reference to FIGS. 4A-4B.

In some other embodiments, the data recovery module 208 takes a reactive approach to perform the data recovery process for the data set. For example, in the reactive approach, the data recovery process is initiated when a request for the data set fails. This approach removes the need for frequent beacon-message transmissions when compared with the proactive approach.

Specifically, in the reactive approach, the data recovery module 208 detects that the one or more data segments of the data set are lost during the first data handover function at least by: (1) detecting that a request for the data set fails; and (2) responsive to a failure of the request for the data set, determining that the one or more data segments of the data set are lost when the first data handover function is performed.

The reactive approach to perform the data recovery process is described further below with reference to FIGS. 5A-5B.

In some embodiments, the data recovery module 208 modifies the operation of the communication unit 145 of the connected vehicle to perform one or more of: (1) collecting the one or more lost data segments from a set of overhearing vehicles 120 that overhears the one or more lost data segments during the previous data handover function; (2) collecting remaining data segments of the data set from the set of overhearing vehicles 120 or from a responsible vehicle that is responsible for maintaining the data set (while the one or more data segments are missing in the responsible vehicle). As a result, the data set is recovered on the connected vehicle and the connected vehicle becomes a new responsible vehicle for the data set.

In some examples, the modification of the operation of the communication unit 145 includes modifying one or more operation elements of the communication unit 145 so that the one or more data segments that are lost during the first data handover function are retrieved from the set of overhearing vehicles by the communication unit 145. Examples of the one or more operation elements of the communication unit 145 include, but are not limited to, one or more of the following elements: (1) one or more active V2X channels to be operated on the communication unit 145; (2) one or more active V2X radios to be operated on the communication unit 145; (3) one or more active V2X antennas to be operated on the communication unit 145; (4) one or more operating frequencies of the one or more active V2X channels; (5) one or more beamforming techniques performed on the one or more active V2X antennas; and (6) a bandwidth allocation scheme of the communication unit 145. Other example operation elements of the communication unit 145 are possible.

For example, responsive to an amount of the lost data segments exceeding a first threshold or a data loss ratio in the V2X network exceeding a second threshold, the data recovery module 208 can modify one or more of the following operation elements of the communication unit 145: (1) increasing the number of active V2X channels so that more V2X channels can be used to collect the lost data segments simultaneously; (2) changing a beamforming technique applied on the V2X antennas so that the data segments can be received at the communication unit 145 with a higher signal-to-noise ratio; and (3) allocating more bandwidth to the communication unit 145 so that the data segments can be retrieved with a faster speed, etc. In this way, efficiency of the data recovery in the vehicular micro cloud 102 can be improved.

The machine learning module 210 can be software including routines that, when executed by the processor 125, cause the processor 125 to generate and analyze feedback data describing a recovery result of lost data segments in a data set. In some embodiments, the machine learning module 210 can be a set of instructions stored in the memory 127 of the computer system 200 and can be accessible and executable by the processor 125. The machine learning module 210 may be adapted for cooperation and communication with the processor 125 and other components of the computer system 200 via a signal line 227.

In some embodiments, the machine learning module 210 generates feedback data describing a recovery result of lost data segments, where the recovery result includes, but is not limited to: (1) a data-segment loss ratio (e.g., a percentage of the lost data segments in the data set); (2) one or more overhearing vehicles 120 where the lost data segments are recovered from; and (3) a time duration needed for recovering the data set, etc. Based on the feedback data, the machine learning module 210 can adjust: (1) the number of overhearing vehicles 120 in the set of overhearing vehicles 120 for each data set; (2) the number of data segments to be overheard by each overhearing vehicle 120 in the set of overhearing vehicles 120; and (3) one or more data segments to be partitioned in each data set or a size of each data segment in a data set. As a result, efficiency of the data recovery can be improved in the vehicular micro cloud 102.

For example, if the data-segment loss ratio indicates that a percentage of the lost data segments in the data set is low (e.g., only 0.5% of all the data segments of a data set are lost)

and the number of overhearing vehicles 120 where the lost data segments are recovered from is small (e.g., 2 overhearing vehicles), the machine learning module 210 can reduce the number of overhearing vehicles 120 in the set of overhearing vehicles 120 for each data set (e.g., reducing the number of overhearing vehicles from ten (10) overhearing vehicles to five (5) overhearing vehicles).

In some embodiments, the machine learning module 210 utilizes one or more machine learning techniques (e.g., a deep learning technique, a neural network, etc.) to analyze the feedback data.

In some embodiments, the machine learning module 210 utilizes a learning algorithm to build the feedback data into a learning database so that efficiency of the data recovery in the vehicular micro cloud 102 can be improved as the learning database stores increasing instances of feedback data (herein, "more and more feedback data"). For example, the machine learning module 210 can build an item of the learning database to include the number of lost data segments for a data set, a response time for performing the data recovery process for the data set and other feedback data, etc. As more and more feedback data is received, more and more items of the learning database can be built. Then, the items in the learning database can be used as training data for training the one or more machine learning techniques used to analyze the feedback data.

In some embodiments, the machine learning module 210 utilizes a learning algorithm and the feedback data is provided as an input to the learning algorithm. As more and more feedback data is received as time elapses, the learning algorithm recursively analyzes the feedback data and improves the operation of the communication unit 145 over time based on the feedback data. For example, the machine learning module 210 predicts that a data-segment loss ratio for data sets is high in the near future based on the learning algorithm's analysis of the feedback data (e.g., the data-segment loss ratio exceeding a threshold in the near future). The machine learning module 210 then modifies the operation of the communication unit 145 (e.g., increasing the number of active V2X ratios of the communication unit 145) so as to improve a lost-data retrieval speed in the near future. In this case, the operation of the communication unit 145 as well as the efficiency of data recovery in the vehicular micro cloud 102 is improved.

Example Processes

Figure 3:
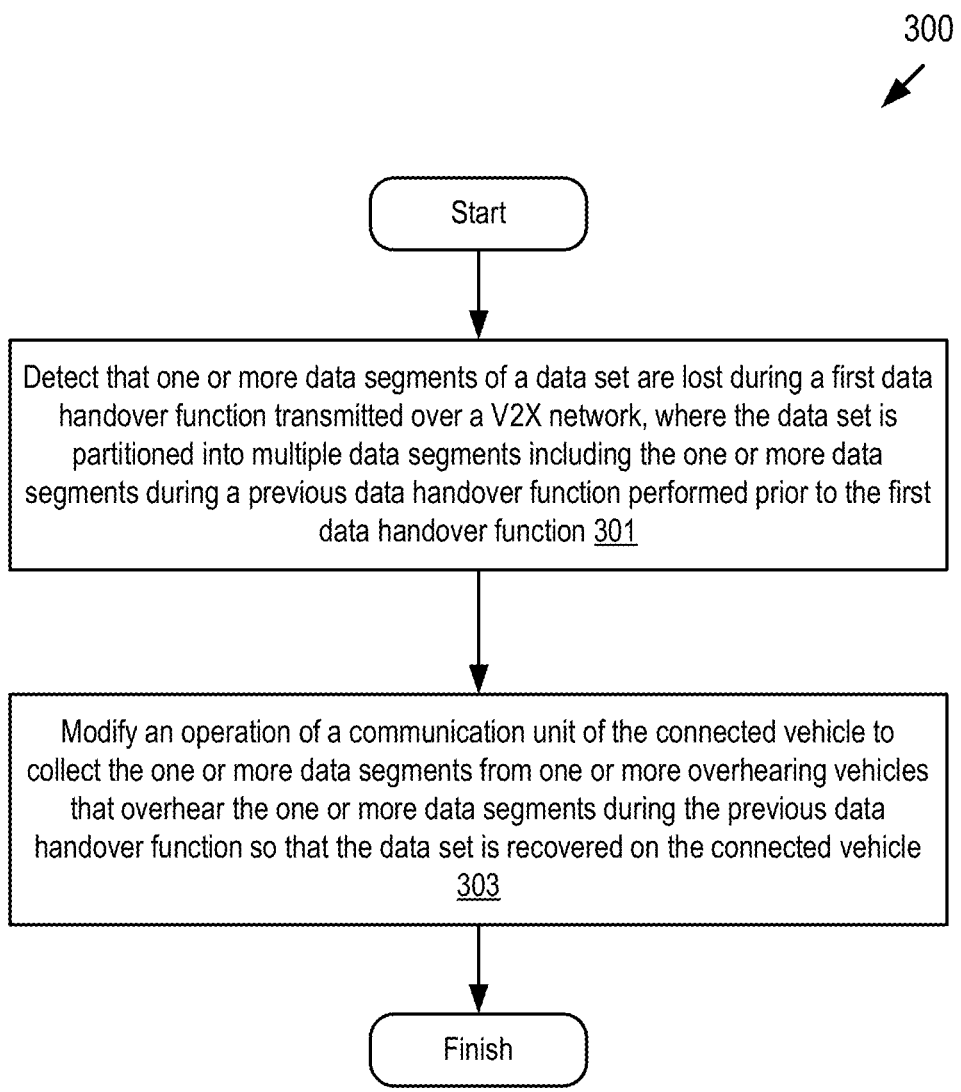
FIG. 3 depicts a method for recovering lost data for a vehicular micro cloud according to some embodiments.

Referring now to FIG. 3, depicted is a flowchart of an example method 300 for recovering lost data for the vehicular micro cloud 102 according to some embodiments. The steps of the method 300 are executable in any order, and not necessarily the order depicted in FIG. 3. Here, assume that the method 300 is performed by a connected vehicle.

At step 301, the data recovery module 208 detects that one or more data segments of a data set are lost during a first data handover function transmitted over a V2X network, where the data set is partitioned into multiple data segments including the one or more data segments during a previous data handover function performed prior to the first data handover function.

At step 303, the data recovery module 208 modifies an operation of the communication unit 145 of the connected vehicle to collect the one or more data segments from a set of overhearing vehicles 120 that overhears the one or more data segments during the previous data handover function so that the data set is recovered on the connected vehicle.

Figure 4A:
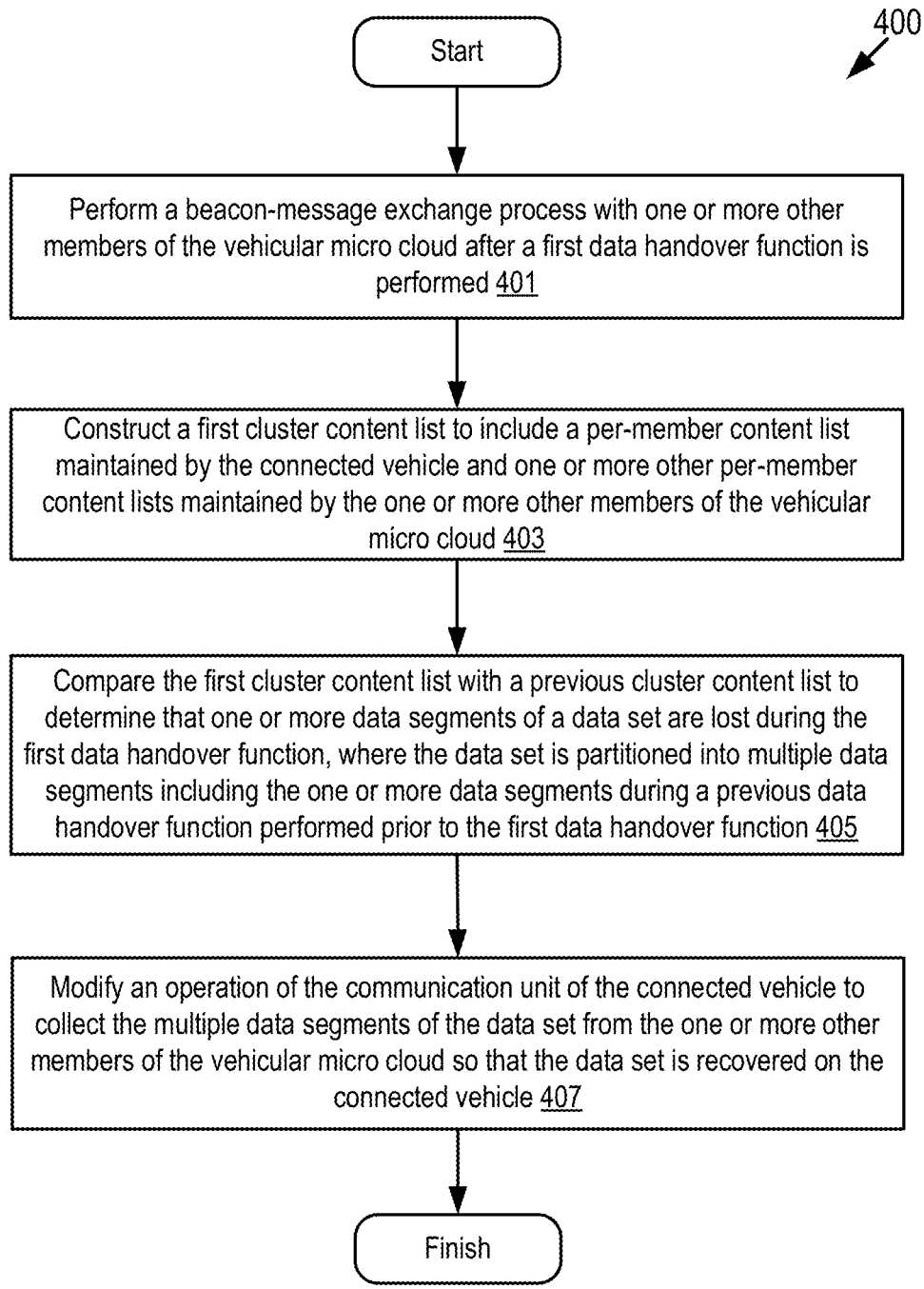
FIG. 4A depicts a method for recovering lost data for a vehicular micro cloud using a proactive approach according to some embodiments.

FIG. 4A depicts a method 400 for recovering lost data for the vehicular micro cloud 102 using a proactive approach according to some embodiments. The steps of the method 400 are executable in any order, and not necessarily the order depicted in FIG. 4A. Here, assume that the method 400 is performed by a connected vehicle.

At step 401, the data recovery module 208 performs a beacon-message exchange process with one or more other members of the vehicular micro cloud 102 after a first data handover function is performed.

At step 403, the data recovery module 208 constructs a first cluster content list to include a per-member content list maintained by the connected vehicle and one or more other per-member content lists maintained by the one or more other members of the vehicular micro cloud 102.

At step 405, the data recovery module 208 compares the first cluster content list with a previous cluster content list to determine that one or more data segments of a data set are lost during the first data handover function, where the data set is partitioned into multiple data segments including the one or more data segments during a previous data handover function performed prior to the first data handover function.

At step 407, the data recovery module 208 modifies an operation of the communication unit 145 of the connected vehicle to collect the multiple data segments of the data set from the one or more other members of the vehicular micro cloud so that the data set is recovered on the connected vehicle. For example, the data recovery module 208 modifies an operation of the communication unit 145 of the connected vehicle to collect the one or more lost data segments of the data set from a set of overhearing vehicles 120.

Figure 4B:
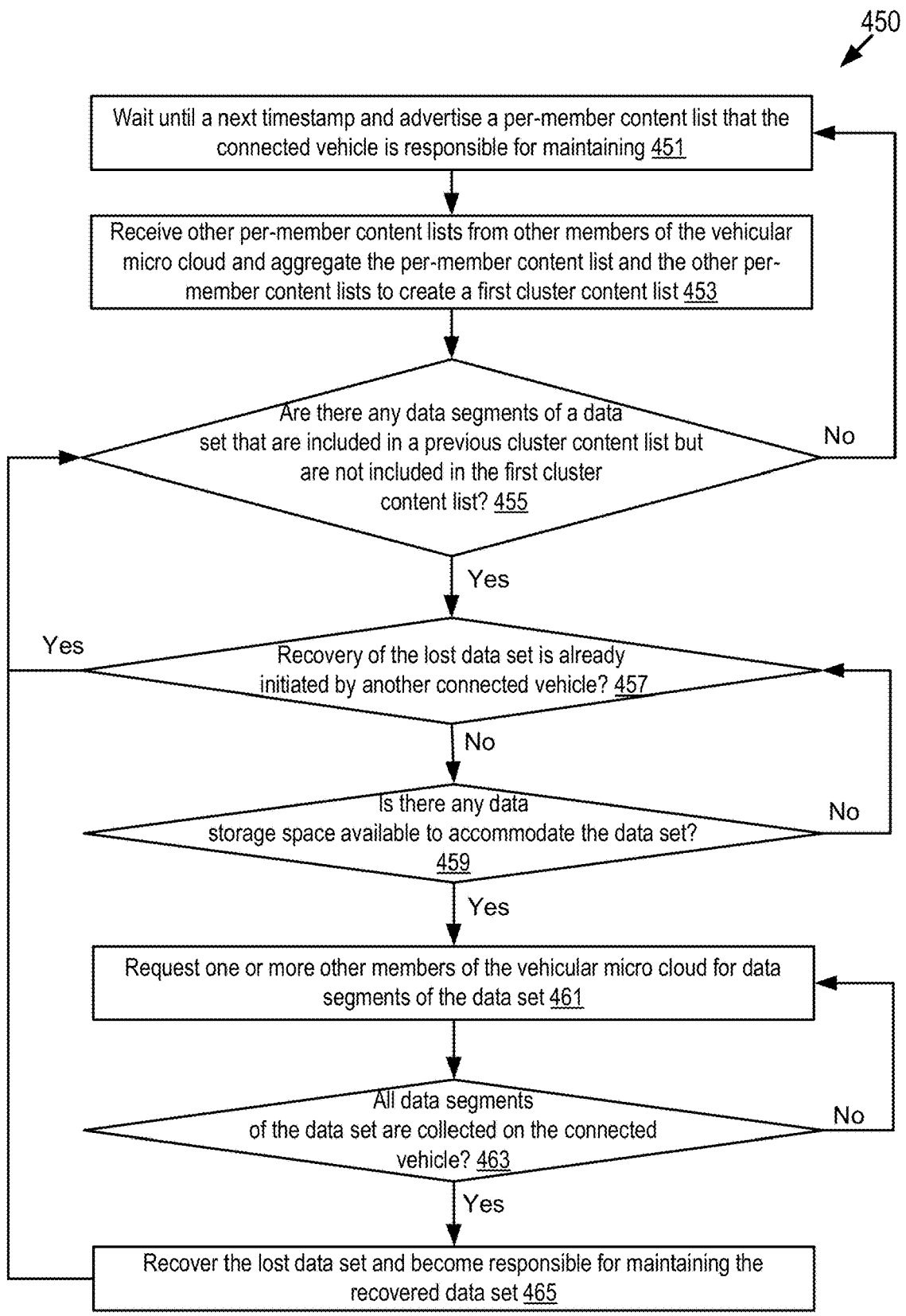
FIG. 4B depicts another method for recovering lost data for a vehicular micro cloud using a proactive approach according to some embodiments.

FIG. 4B depicts another method 450 for recovering lost data for the vehicular micro cloud 102 using a proactive approach according to some embodiments. The steps of the method 450 are executable in any order, and not necessarily the order depicted in FIG. 4B. Here, assume that the method 450 is performed by a connected vehicle.

At step 451, after a first data handover function is performed, the data recovery module 208 waits until a next timestamp and advertises a per-member content list that the connected vehicle is responsible for maintaining after the first data handover function is performed.

At step 453, the data recovery module 208 receives other per-member content lists from other members of the vehicular micro cloud 102 and aggregates the per-member content list and the other per-member content lists to create a first cluster content list.

At step 455, the data recovery module 208 determines whether there are any data segments of a data set that are included in a previous cluster content list but are not included in the first cluster content list. Responsive to there being one or more data segments of the data set that are included in the previous cluster content list but are not included in the first cluster content list, the data recovery module 208 determines that the data set is lost (e.g., the one or more data segments are lost) during the first data handover function. The method 450 moves to step 457. Otherwise, the method 450 moves back to step 451.

At step 457, the data recovery module 208 determines whether recovery of the lost data set is already initiated by another connected vehicle. Responsive to recovery of the lost data set being already initiated by another connected vehicle, the method 450 moves back to step 455 to determine whether there are additional data sets that are lost during the first data handover function. Otherwise, when no other connected vehicle has initiated recovery of the lost data set, the method 450 moves to step 459.

At step 459, the data recovery module 208 determines whether there is any data storage space available to accommodate the data set on the connected vehicle. Responsive to the connected vehicle having data storage space available, the method 450 moves to step 461. Otherwise, the method 450 moves to step 457.

At step 461, the data recovery module 208 requests one or more other members of the vehicular micro cloud 102 for data segments of the data set. For example, the data recovery module 208 collects the one or more lost data segments of the data set from a set of overhearing vehicles 120 and other data segments of the data set from a responsible vehicle of the data set (or from the set of overhearing vehicles 120).

At step 463, the data recovery module 208 determines whether all data segments of the data set are collected on the connected vehicle. Responsive to all data segments of the data set being collected on the connected vehicle, the method 450 moves to step 465. Otherwise, the method 450 moves to step 461.

At step 465, the data recovery module 208 recovers the lost data set and becomes responsible for maintaining the recovered data set. Next, the method 450 moves back to step 455 to determine whether there are additional data sets that are lost during the first data handover function. The steps 457-465 may be executed for each lost data set.

In some embodiments, the method 450 may end when all the lost data sets are recovered in the vehicular micro cloud 102. In some embodiments, the method 450 is executed periodically in a pre-defined interval.

Figure 5A:
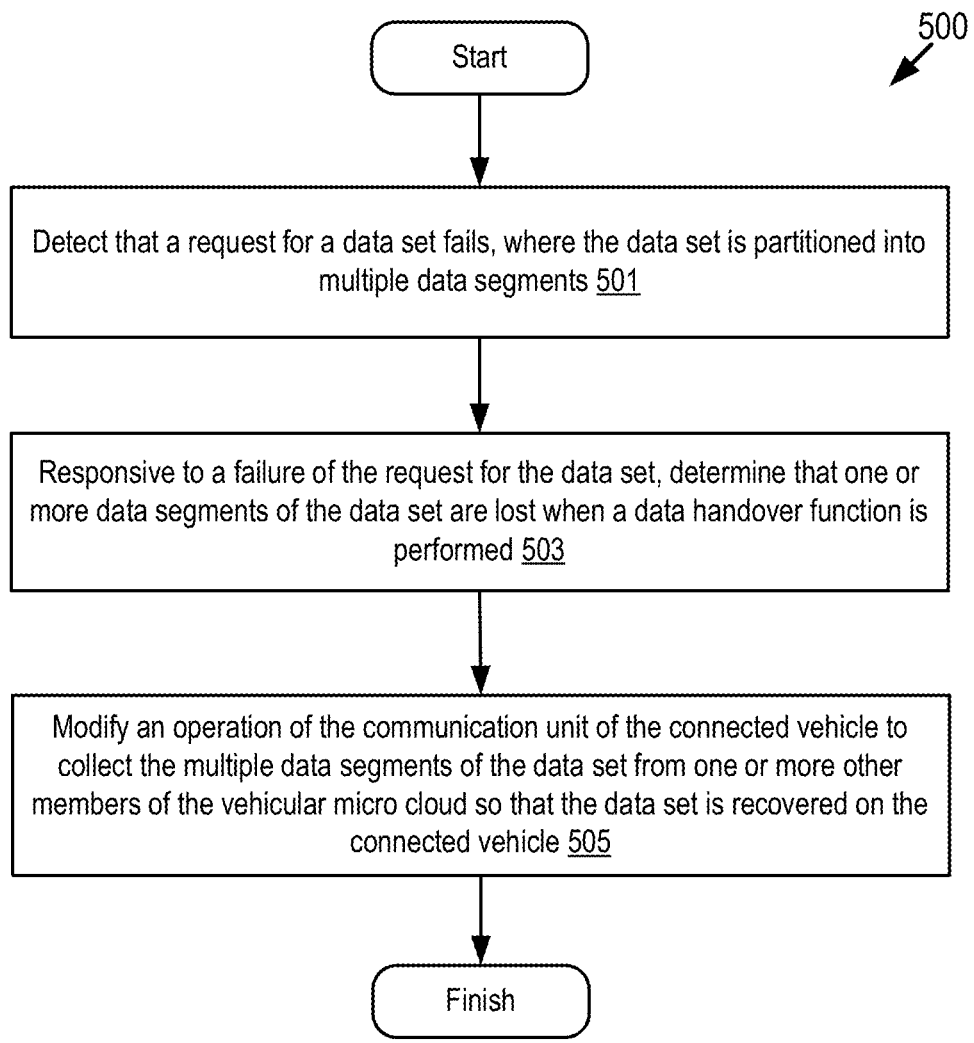
FIG. 5A depicts a method for recovering lost data for a vehicular micro cloud using a reactive approach according to some embodiments.

FIG. 5A depicts a method 500 for recovering lost data for the vehicular micro cloud 102 using a reactive approach according to some embodiments. The steps of the method 500 are executable in any order, and not necessarily the order depicted in FIG. 5A. Here, assume that the method 500 is performed by a connected vehicle.

At step 501, the data recovery module 208 detects that a request for a data set fails, where the data set is partitioned into multiple data segments.

At step 503, responsive to a failure of the request for the data set, the data recovery module 208 determines that one or more data segments of the data set are lost when a data handover function is performed.

At step 505, the data recovery module 208 modifies an operation of the communication unit 145 of the connected vehicle to collect the multiple data segments of the data set from one or more other members of the vehicular micro cloud 102 so that the data set is recovered on the connected vehicle. For example, the data recovery module 208 collects the one or more lost data segments of the data set from a set of overhearing vehicles 120 and other data segments of the data set from a responsible vehicle of the data set (or from the set of overhearing vehicles 120).

Figure 5B:
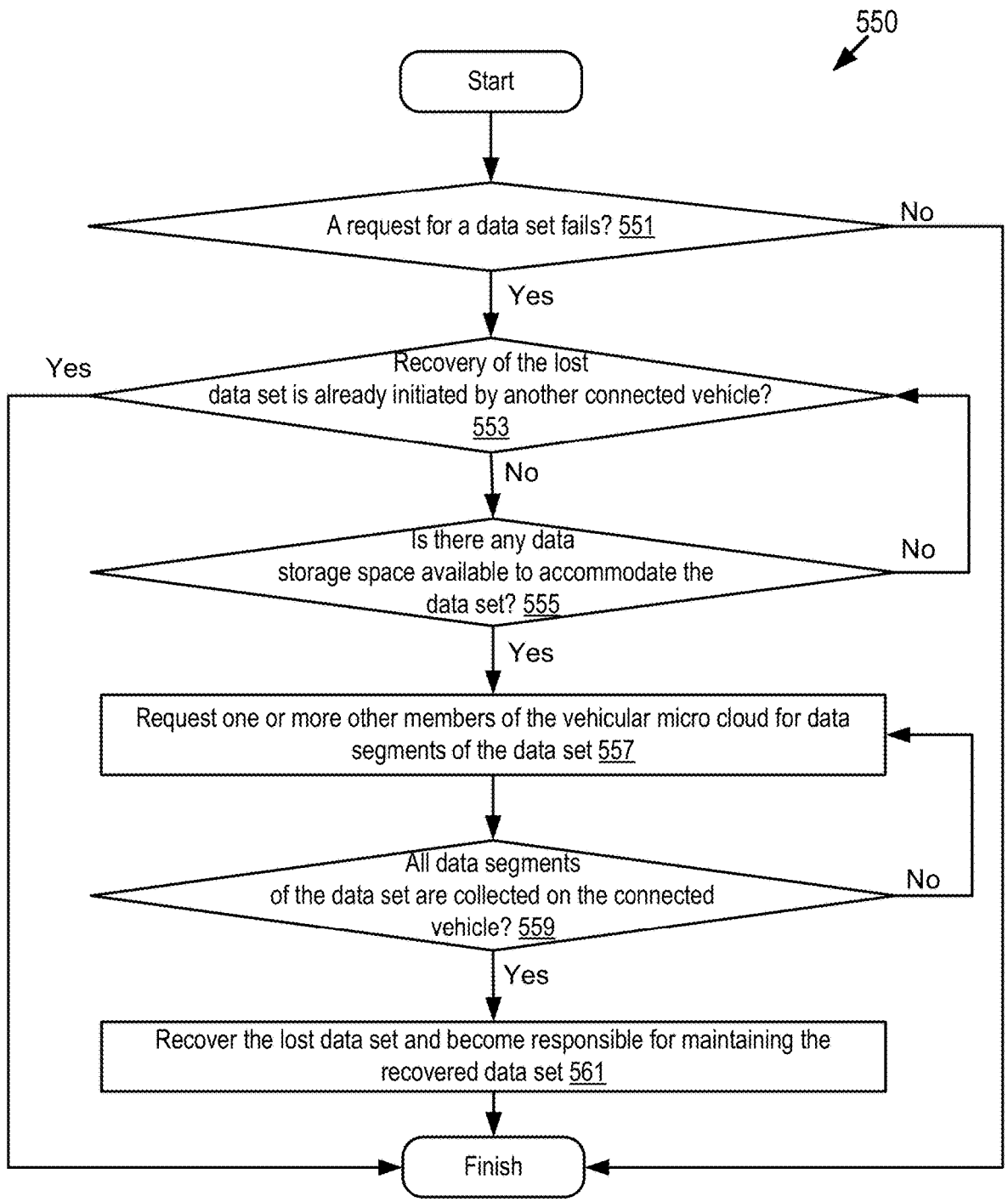
FIG. 5B depicts another method for recovering lost data for a vehicular micro cloud using a reactive approach according to some embodiments.

FIG. 5B depicts another method 550 for recovering lost data for the vehicular micro cloud 102 using a reactive approach according to some embodiments. The steps of the method 550 are executable in any order, and not necessarily the order depicted in FIG. 5B. Here, assume that the method 550 is performed by a connected vehicle.

At step 551, the data recovery module 208 determines whether a request for a data set fails. Responsive to a failure of the request for the data set, the data recovery module 208 determines that the data set is lost (e.g., one or more data segments of the data set are lost) during a data handover function. The method 550 moves to step 553. Otherwise, the method 550 ends.

At step 553, the data recovery module 208 determines whether recovery of the lost data set is already initiated by another connected vehicle. Responsive to recovery of the lost data set being already initiated by another connected vehicle, the method 550 ends. Otherwise, when no other connected vehicle has initiated recovery of the lost data set, the method 550 moves to step 555.

At step 555, the data recovery module 208 determines whether there is any data storage space available to accommodate the data set on the connected vehicle. Responsive to the connected vehicle having data storage space available, the method 550 moves to step 557. Otherwise, the method 550 moves to step 553.

At step 557, the data recovery module 208 requests one or more other members of the vehicular micro cloud 102 for data segments of the data set. For example, the data recovery module 208 collects the one or more lost data segments of the data set from a set of overhearing vehicles 120 and other data segments of the data set from a responsible vehicle of the data set (or from the set of overhearing vehicles 120).

At step 559, the data recovery module 208 determines whether all data segments of the data set are collected on the connected vehicle. Responsive to all data segments of the data set being collected on the connected vehicle, the method 550 moves to step 561. Otherwise, the method 550 moves to step 557.

At step 561, the data recovery module 208 recovers the lost data set and becomes responsible for maintaining the recovered data set.

Figure 6:
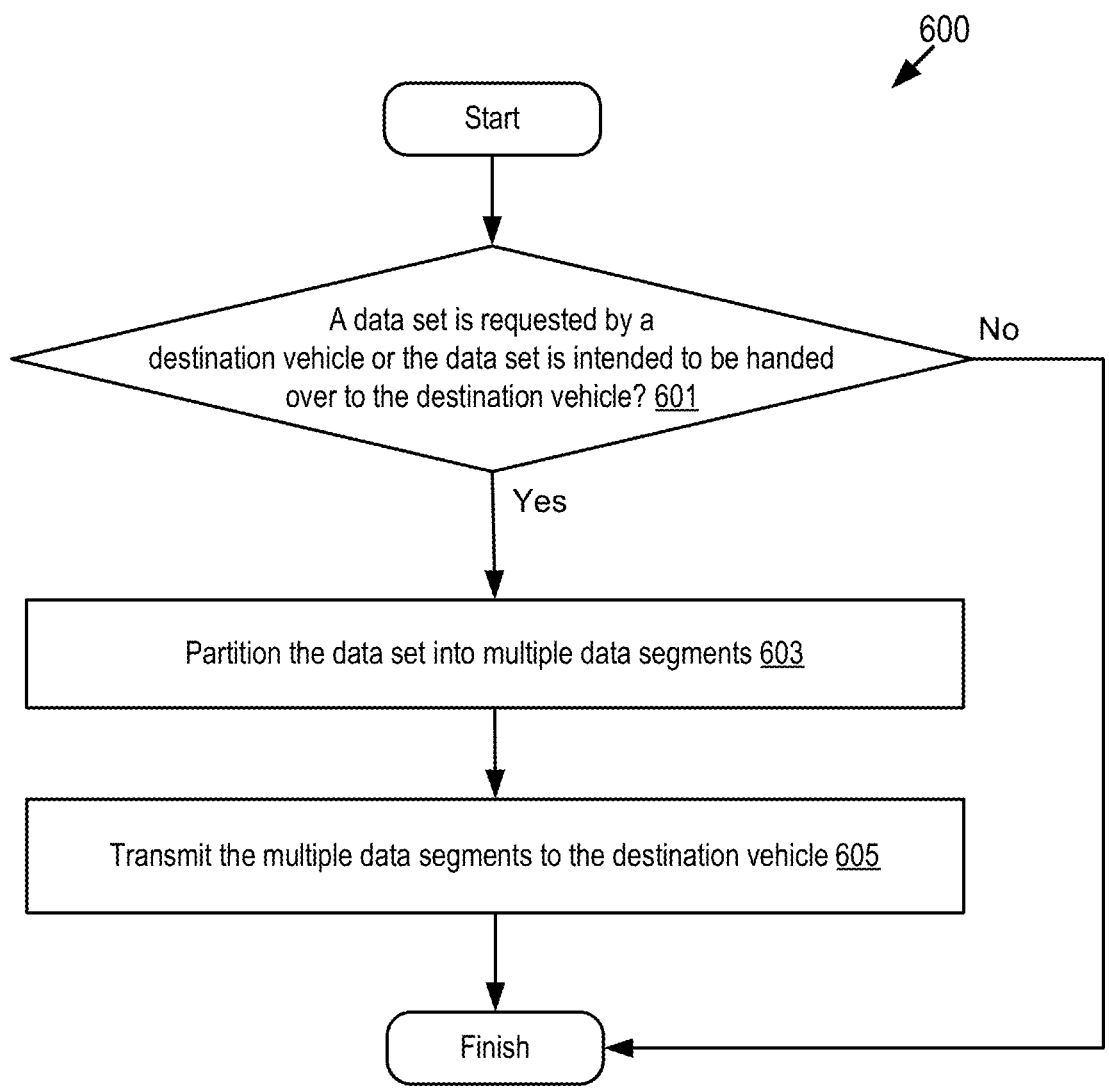
FIG. 6 depicts a method for performing a data handover function according to some embodiments.

FIG. 6 depicts a method 600 for performing a data handover function according to some embodiments. The steps of the method 600 are executable in any order, and not necessarily the order depicted in FIG. 6. Here, assume that the method 600 is performed by a connected vehicle.

At step 601, the data handover module 204 determines whether a data set is requested by a destination vehicle or the data set is intended to be handed over to the destination vehicle. Responsive to the data set being requested by the destination vehicle or the data set is intended to be handed over to the destination vehicle, the method 600 moves to step 603. Otherwise, the method 600 ends.

At step 603, the data handover module 204 partitions the data set into multiple data segments.

At step 605, the data handover module 204 transmits the multiple data segments to the destination vehicle.

Figure 7A:
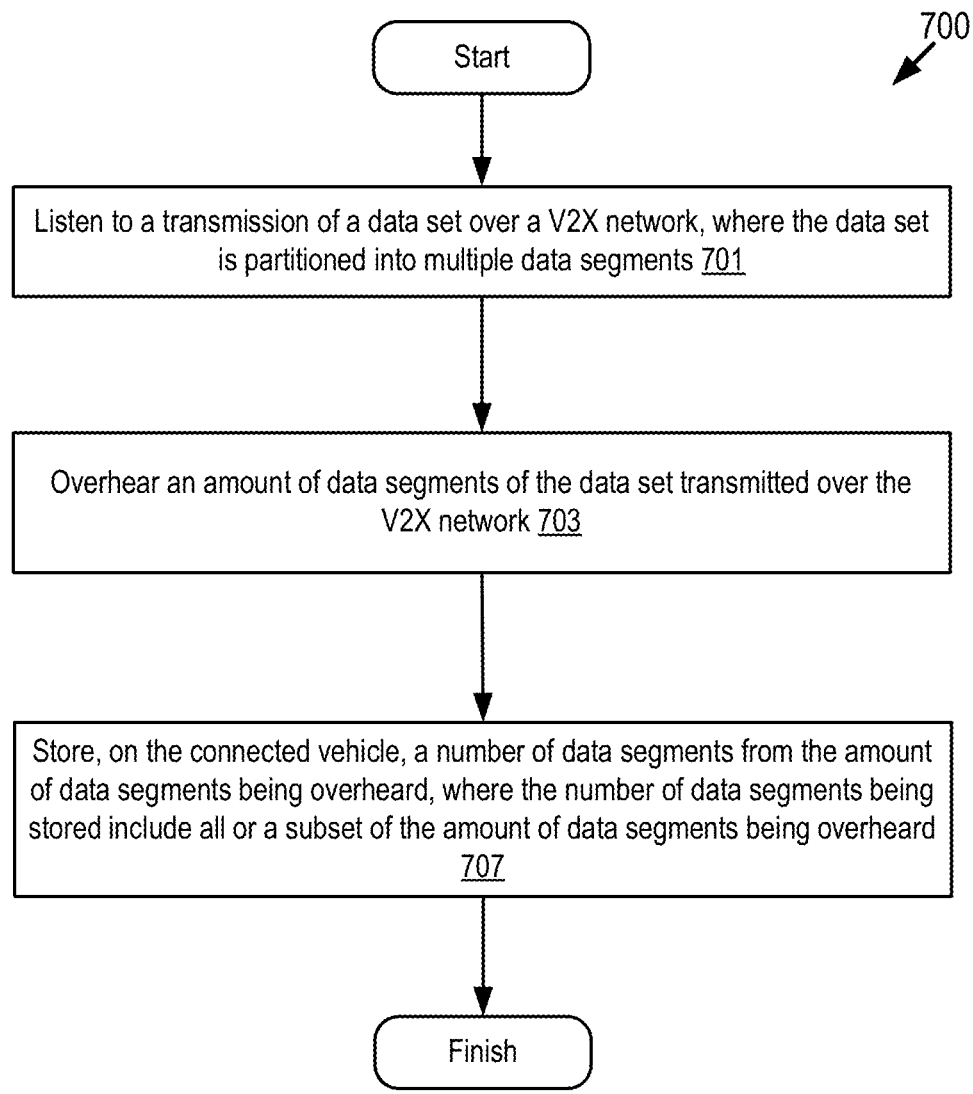
FIG. 7A depicts a method for overhearing data segments of a data set according to some embodiments.

FIG. 7A depicts a method 700 for overhearing data segments of a data set according to some embodiments. The steps of the method 700 are executable in any order, and not necessarily the order depicted in FIG. 7A. Here, assume that the method 700 is performed by a connected vehicle.

At step 701, the overhearing module 206 listens to a transmission of the data set over the V2X network.

At step 703, the overhearing module 206 overhears an amount of data segments of the data set transmitted over the V2X network. The amount of data segments being overheard can be at least a subset of the multiple data segments of the data set.

At step 707, the overhearing module 206 stores, on the connected vehicle, a number of data segments from the amount of data segments of the data set being overheard. The number of data segments being stored can be all or a subset of the amount of data segments being overheard.

Figure 7B:
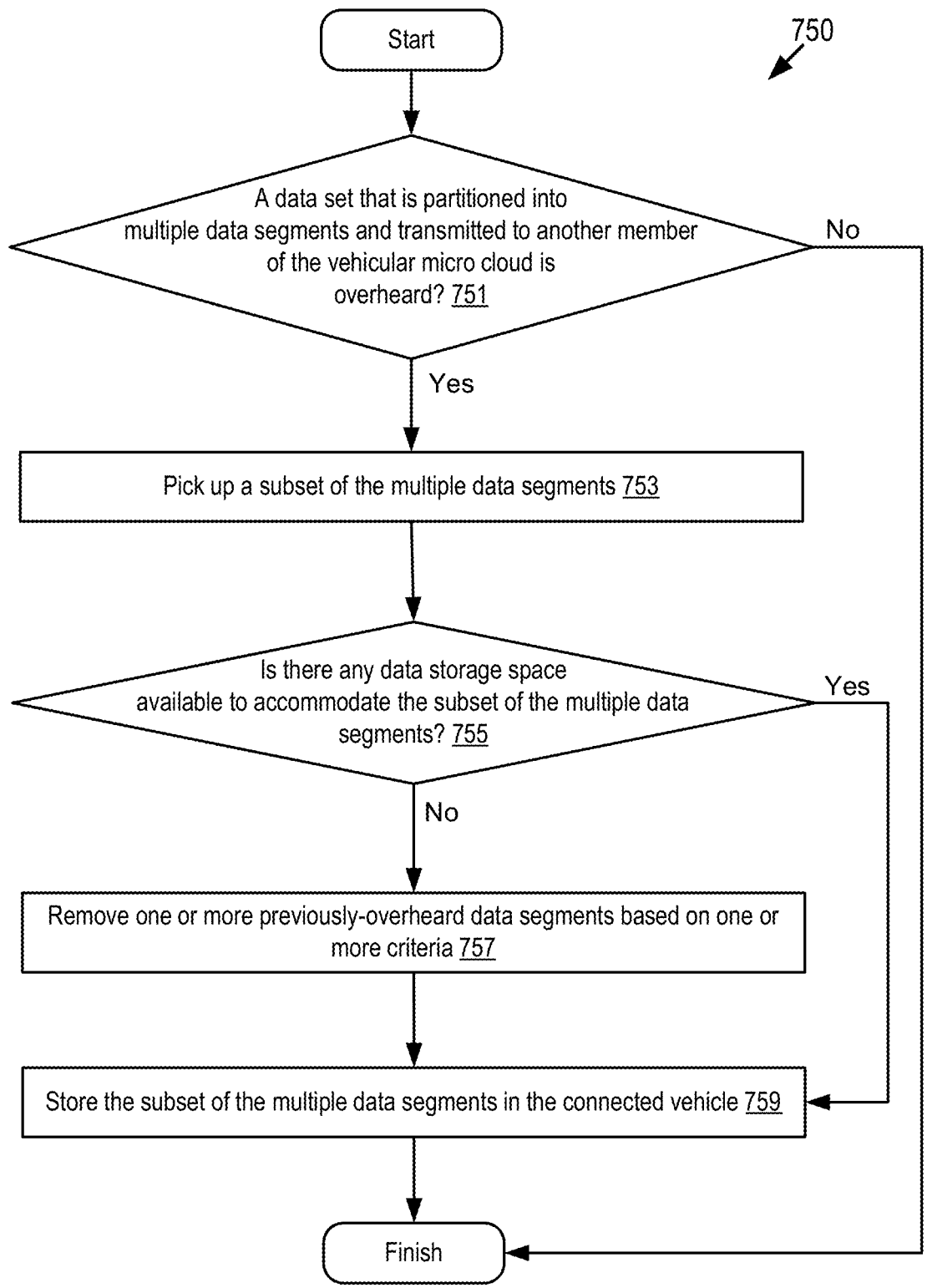
FIG. 7B depicts another method for overhearing data segments of a data set according to some embodiments.

FIG. 7B depicts a method 750 for overhearing data segments of a data set according to some embodiments. The steps of the method 750 are executable in any order, and not necessarily the order depicted in FIG. 7B. Here, assume that the method 750 is performed by a connected vehicle.

At step 751, the overhearing module 206 determines whether a data set that is partitioned into multiple data segments and transmitted to another member of the vehicular micro cloud 102 is overheard. Responsive to the data set being overheard, the method 750 moves to step 753. Otherwise, the method 750 ends.

At step 753, the overhearing module 206 picks up a subset of the multiple data segments.

At step 755, the overhearing module 206 determines whether there is any data storage space available to accommodate the subset of the multiple data segments. Responsive to there being available data storage space, the method 750 moves to step 759. Otherwise, the method 750 moves to step 757.

At step 757, the overhearing module 206 removes one or more previously-overheard data segments based on one or more criteria.

At step 759, the overhearing module 206 stores the subset of the multiple data segments in the connected vehicle.

FIGS. 8A and 8B are graphical representations illustrating example DSRC data 800 and 850 according to some embodiments. DSRC messages are just one example of V2X wireless communications that may be used to distribute data among micro cloud members according to some embodiments. Any other wireless communication technique may be used to distribute data. As such, any routing protocol that works over any wireless media can be used to distribute data to other micro cloud members that are more than one-hop away from a given micro cloud member.

Vehicles are increasingly equipped with DSRC. DSRC-equipped vehicles may broadcast a DSRC message at an adjustable rate of once every 0.10 seconds. For example, the DSRC-equipped vehicle may transmit Basic Safety Messages (BSM messages). These BSM messages include DSRC data. The BSM messages may be used to transmit the list data. FIG. 8A depicts a block diagram illustrating some of the DSRC data that is included in each BSM message.

The following is a summary of the content of FIG. 8B. Part 1 of the DSRC message includes core data elements, including a vehicle position, heading, speed, acceleration, steering wheel angle, and vehicle size. The DSRC message is transmitted at an adjustable rate of about 10 times per second.

Part 2 of the DSRC message includes a variable set of data elements drawn from an extensive list of optional elements. Some of them are selected based on event triggers, e.g., ABS activated. They are added to Part 1 and sent as part of the DSRC message, but many are transmitted less frequently in order to conserve bandwidth. The DSRC message includes only current snapshots (with the exception of path data which is itself limited to a few second's worth of past history data).

Figure 9:
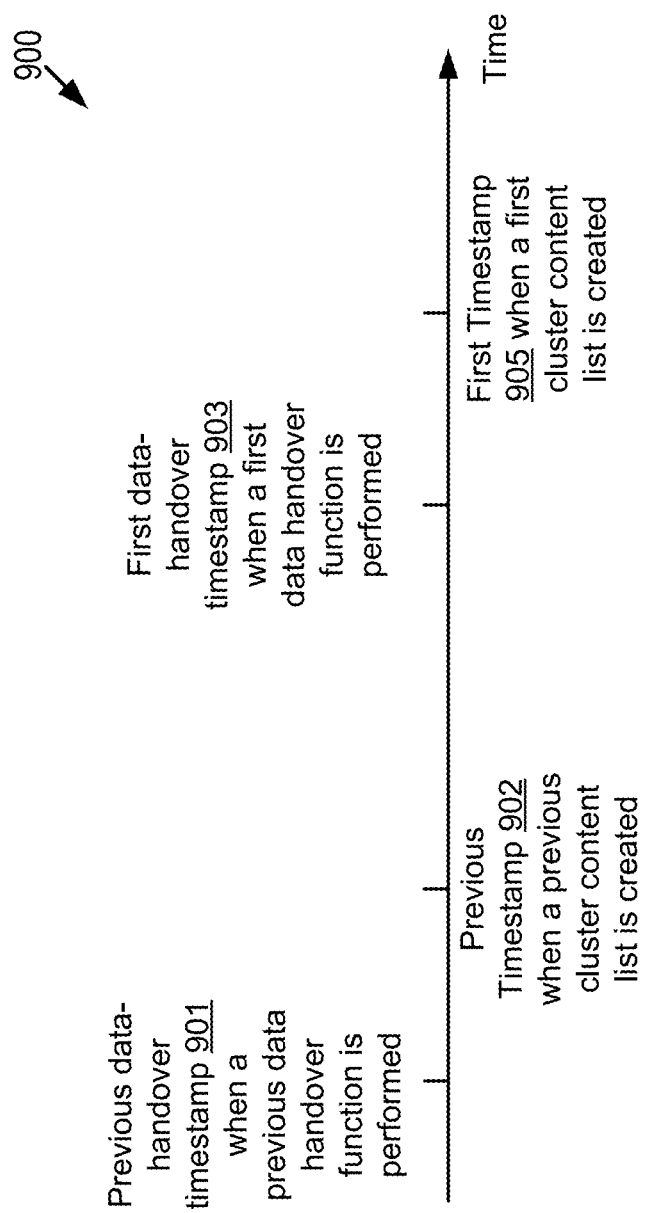
FIG. 9 is a graphical representation illustrating example timestamps for performing a previous data handover function, constructing a previous cluster content list, performing a first data handover function, and constructing a first cluster content list according to some embodiments.

FIG. 9 is a graphical representation 900 illustrating example timestamps for performing a previous data handover function, constructing a previous cluster content list, performing a first data handover function, and constructing a first cluster content list according to some embodiments. FIG. 9 is described above, and a similar description is not repeated here.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a connected vehicle that is a member of a vehicular micro cloud, comprising:
   detecting that one or more data segments of a first data set are lost during a first data handover function transmitted over a Vehicle-to-Everything (V2X) network, wherein the first data set is partitioned into multiple data segments including the one or more data segments during a previous data handover function performed prior to the first data handover function; and
   modifying an operation of a communication unit of the connected vehicle to collect the one or more data segments from a set of overhearing vehicles that overhears the one or more data segments during the previous data handover function so that the first data set is recovered on the connected vehicle.

2. The method of claim 1, wherein modifying the operation of the communication unit of the connected vehicle includes modifying one or more operation elements of the communication unit so that the one or more data segments that are lost during the first data handover function are retrieved from the one or more overhearing vehicles by the communication unit.

3. The method of claim 2, wherein the one or more operation elements of the communication unit include one or more of the following: one or more active V2X channels to be operated on the communication unit; one or more active V2X radios to be operated on the communication unit; one or more active V2X antennas to be operated on the communication unit; one or more operating frequencies of the one or more active V2X channels; one or more beamforming techniques performed on the one or more active V2X antennas; and a bandwidth allocation scheme of the communication unit.

4. The method of claim 1, wherein detecting that the one or more data segments of the first data set are lost during the first data handover function comprises:
   constructing a first cluster content list that includes a first aggregated list of data sets and constituent data segments of each data set in the first aggregated list after the first data handover function is performed; and
   detecting that the one or more data segments of the first data set are lost during the first data handover function based at least in part on the first cluster content list.

5. The method of claim 4, wherein constructing the first cluster content list after the first data handover function is performed comprises:
   performing a beacon-message exchange process with one or more other members of the vehicular micro cloud after the first data handover function is performed, including:
      transmitting a beacon message including a per-member content list maintained by the connected vehicle to the one or more other members of the vehicular micro cloud via the V2X network; and
      receiving one or more other beacon messages including one or more other per-member content lists from the one or more other members of the vehicular micro cloud; and
   constructing the first cluster content list to include the per-member content list maintained by the connected vehicle and the one or more other per-member content lists maintained by the one or more other members of the vehicular micro cloud.

6. The method of claim 5, wherein each per-member content list maintained by a corresponding member of the vehicular micro cloud includes a per-member list of data sets maintained by the corresponding member of the vehicular micro cloud and data segments of each data set in the per-member list after the first data handover function is performed.

7. The method of claim 4, wherein detecting that the one or more data segments of the first data set are lost during the first data handover function based at least in part on the first cluster content list comprises:
comparing the first cluster content list with a previous cluster content list to determine that the one or more data segments of the first data set are lost during the first data handover function.

8. The method of claim 7, wherein:
the previous cluster content list includes a previous aggregated list of data sets and constituent data segments of each data set in the previous aggregated list; and
comparing the first cluster content list with the previous cluster content list to determine that the one or more data segments of the first data set are lost during the first data handover function comprises:
responsive to determining that the one or more data segments are included in the previous cluster content list while missing in the first cluster content list, determining that the one or more data segments are lost during the first data handover function.

9. The method of claim 7, wherein the first cluster content list is constructed after the first data handover function is performed, and the previous cluster content list is constructed after the previous data handover function is performed while prior to the first data handover function is performed.

10. The method of claim 7, wherein the first cluster content list is constructed after the first data handover function is performed, and the previous cluster content list is constructed prior to the first data handover function is performed at least by:
receiving a V2X wireless message from a source vehicle that partitions the first data set into the multiple data segments, wherein the V2X wireless message includes data-set identification (ID) data used to identify the first data set and segment ID data used to identify the multiple data segments that constitute the first data set; and
constructing the previous cluster content list to include the data-set ID data of the first data set and the segment ID data of the multiple data segments.

11. The method of claim 1, wherein detecting that the one or more data segments of the first data set are lost during the first data handover function comprises:
detecting that a request for the first data set fails; and
responsive to a failure of the request for the first data set, determining that the one or more data segments of the first data set are lost when the first data handover function is performed.

12. The method of claim 1, wherein the first data set is encoded into Q coded blocks using a coding technique and each of the Q coded blocks is treated as a data segment so that a probability of successful data recovery for the first data set is improved, wherein Q is a positive integer.

13. The method of claim 1, wherein the connected vehicle acts as an overhearing vehicle for a second data set that is transmitted over the V2X network, and the method further comprises:

listening to a transmission of the second data set over the V2X network;
overhearing an amount of data segments of the second data set transmitted over the V2X network; and
storing a number of data segments from the amount of data segments being overheard on the connected vehicle, wherein the number of data segments being stored include all or a subset of the amount of data segments being overheard.

14. The method of claim 13, wherein the number of data segments of the second data set overheard and stored by the connected vehicle includes a predetermined number of data segments from the second data set.

15. The method of claim 13, wherein the number of data segments of the second data set overheard and stored by the connected vehicle includes a dynamic number of data segments from the second data set.

16. The method of claim 15, wherein the dynamic number of data segments is determined based on one or more of a total number of members in the vehicular micro cloud, availability of a data storage resource on the connected vehicle, a size of the second data set, a data-segment loss ratio in the vehicular micro cloud and feedback data describing a recovery result of the first data set.

17. A system comprising:
an onboard vehicle computer system of a connected vehicle in a vehicular micro cloud, including a communication unit, a processor and a non-transitory memory storing computer code which, when executed by the processor, causes the processor to:
detect that one or more data segments of a first data set are lost during a first data handover function transmitted over a Vehicle-to-Everything (V2X) network, wherein the first data set is partitioned into multiple data segments including the one or more data segments during a previous data handover function performed prior to the first data handover function; and
modify an operation of the communication unit of the connected vehicle to collect the one or more data segments from a set of overhearing vehicles that overhears the one or more data segments during the previous data handover function so that the first data set is recovered on the connected vehicle.

18. The system of claim 17, wherein the connected vehicle acts as an overhearing vehicle for a second data set that is transmitted over the V2X network, and wherein the computer code, when executed by the processor, causes the processor further to:
listen to a transmission of the second data set over the V2X network;
overhear an amount of data segments of the second data set transmitted over the V2X network; and
store a number of data segments from the amount of data segments being overheard on the connected vehicle, wherein the number of data segments being stored include all or a subset of the amount of data segments being overheard.

19. A computer program product of a connected vehicle including a communication unit, the computer program product comprising a non-transitory memory storing computer-executable code that, when executed by a processor, causes the processor to:
detect that one or more data segments of a first data set are lost during a first data handover function transmitted over a Vehicle-to-Everything (V2X) network, wherein the first data set is partitioned into multiple data segments including the one or more data segments during a previous data handover function performed prior to the first data handover function; and modify an operation of the communication unit of the connected vehicle to collect the one or more data segments from a set of overhearing vehicles that overhears the one or more data segments during the previous data handover function so that the first data set is recovered on the connected vehicle.

20. The computer program product of claim 19, wherein the computer-executable code, when executed by the processor, causes the processor further to:

listen to a transmission of a second data set over the V2X network;

overhear an amount of data segments of the second data set transmitted over the V2X network; and store a number of data segments from the amount of data segments being overheard on the connected vehicle, wherein the number of data segments being stored include all or a subset of the amount of data segments being overheard.

\* \* \* \* \*